(12) United States Patent
Yassur et al.

(10) Patent No.: US 9,131,110 B2
(45) Date of Patent: Sep. 8, 2015

(54) SYSTEM AND METHOD FOR HANDLING CRITICAL PACKETS LOSS IN MULTI-HOP RTP STREAMING

(71) Applicant: Polycom, Inc., San Jose, CA (US)

(72) Inventors: Amir Yassur, Nordiya (IL); David Bourgoyne, The Hills, TX (US); Avishay Halavy, Tel-Aviv (IL); John Spearman, Austin, TX (US); Dmitry Veremeev, Petach-Tikva (IL); Xiaowei Wang, Austin, TX (US)

(73) Assignee: Polycom, Inc., San Jose, CA (US)

( * ) Notice: Subject to any disclaimer, the term of this patent is extended or adjusted under 35 U.S.C. 154(b) by 191 days.

(21) Appl. No.: 13/763,382

(22) Filed: Feb. 8, 2013

(65) Prior Publication Data

US 2013/0208079 A1 Aug. 15, 2013

Related U.S. Application Data

(60) Provisional application No. 61/597,524, filed on Feb. 10, 2012.

(51) Int. Cl.
*H04N 7/14* (2006.01)
*H04N 7/15* (2006.01)
*H04L 29/06* (2006.01)

(52) U.S. Cl.
CPC .............. *H04N 7/152* (2013.01); *H04L 65/608* (2013.01); *H04L 65/80* (2013.01); *H04L 69/22* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 6,757,248 B1 * | 6/2004 | Li et al. | 370/235 |
| 8,699,383 B2 * | 4/2014 | Katis et al. | 370/260 |
| 2002/0021700 A1 * | 2/2002 | Hata et al. | 370/395.42 |
| 2002/0135324 A1 * | 9/2002 | Fujii et al. | 315/291 |
| 2006/0291468 A1 * | 12/2006 | Bopardikar et al. | 370/392 |
| 2007/0113274 A1 * | 5/2007 | Hariharan et al. | 726/13 |
| 2009/0168759 A1 * | 7/2009 | Katis et al. | 370/352 |
| 2009/0168760 A1 * | 7/2009 | Katis et al. | 370/352 |
| 2009/0300459 A1 | 12/2009 | Fukuoka | |
| 2010/0074126 A1 * | 3/2010 | Chen et al. | 370/252 |

(Continued)

FOREIGN PATENT DOCUMENTS

JP       2002-135324       5/2002

OTHER PUBLICATIONS

Japanese Office Action issued in co-pending Japanese Application No. P2013-023353, Mar. 4, 2014, 4 pages (including translation).

(Continued)

*Primary Examiner* — Maria El-Zoobi
(74) *Attorney, Agent, or Firm* — Blank Rome, LLP

(57) ABSTRACT

Disclosed are example embodiments of a method and system to reduce re-transmission requirements of a compress media transferring system implemented in a network where packet loss could be possible. An extended header for each transmitted packet can indicate the priority of the packet and endpoints can determine if a re-transmission of a missing packet is desired. Buffering of packets at different hops in a multi-hop system could allow for the retransmission request to be satisfied by a more recent hop than the original system transmitting the video packet. In one embodiment three levels of priority are established to achieve a reliable frame rate of 30 frames per second by compressing the first and second levels at 7.5 frames per second and a third level at 15 frames per second.

32 Claims, 9 Drawing Sheets

(56) References Cited

U.S. PATENT DOCUMENTS

2013/0188562 A1\* 7/2013 Espina Perez et al. ....... 370/328
2013/0208079 A1 8/2013 Yassur et al.

OTHER PUBLICATIONS

Korean Office Action issued in co-pending Korean Application No. 10-2013-0014703, Feb. 28, 2014, 10 pages (including translation).

Extended European Search Report regarding EP Application No. 13154550.1, dated Jun. 10, 2013.

Miyazaki et al., "RTP Payload Formats to Enable Multiple Selective Retransmissions," Audio/Video Transport Working Group, Internet Draft, draft-ietf-avt-rtpselret-05. txt, vol. avt, No. 5, Jun. 1, 2002, 30 pages.

\* cited by examiner

… (1)

SYSTEM AND METHOD FOR HANDLING CRITICAL PACKETS LOSS IN MULTI-HOP RTP STREAMING

CROSS REFERENCE TO RELATED APPLICATIONS

This application claims priority to U.S. Provisional Application Ser. No. 61/597,524, entitled "SYSTEM AND METHOD FOR HANDLING CRITICAL PACKETS LOSS IN MULTI-HOP RTP STREAMING," filed Feb. 10, 2012, and which is incorporated by reference in its entirety herein.

FIELD OF THE INVENTION

The present invention relates to video communication and more particularly to the field of multipoint video conferencing.

BACKGROUND

Videoconferencing enables individuals located remotely from each other to conduct a face-to-face meeting. Videoconferencing may be executed by using audio and video telecommunications. A videoconference may be between as few as two sites (point-to-point), or between several sites (multipoint). A conference site may include a single participant (user, conferee) or several participants (users, conferees). Videoconferencing may also be used to share documents, presentations, information, and the like.

Participants may take part in a videoconference via a videoconferencing endpoint (EP), for example. An endpoint (EP) may be a terminal on a network, for example. An endpoint may be capable of providing real-time, two-way, audio/visual/data communication with other terminals and/or with a multipoint control unit (MCU). An endpoint (EP) may provide information/data in different forms, including audio; audio and video; data, audio, and video; etc. The terms "terminal," "site," and "endpoint" may be used interchangeably. In the present disclosure, the term endpoint may be used as a representative term for above group.

An endpoint may comprise a display unit (screen), upon which video images from one or more remote sites may be displayed. Example endpoints include POLYCOM® VSX® and HDX® series endpoints, each available from Polycom, Inc. (POLYCOM, VSX, and HDX are registered trademarks of Polycom, Inc.) A videoconferencing endpoint may send audio, video, and/or data from a local site to one or more remote sites, and display video and/or data received from the remote site(s) on its screen (display unit).

Video images displayed on a screen at an endpoint may be displayed in an arranged layout. A layout may include one or more segments for displaying video images. A segment may be a predefined portion of a screen of a receiving endpoint that may be allocated to a video image received from one of the sites participating in the videoconferencing session. In a videoconference between two participants, a segment may cover the entire display area of the screens of the endpoints. In each site, the segment may display the video image received from the other site.

An example of a video display mode in a videoconference between a local site and multiple remote sites may be a switching mode. A switching mode may be such that video/data from only one of the remote sites is displayed on the local site's screen at a time. The displayed video may be switched to video received from another site depending on the dynamics of the conference.

In contrast to the switching mode, in a continuous presence (CP) conference, a conferee (participant) at a local endpoint may simultaneously observe several other conferees from different endpoints participating in the videoconference. Each site may be displayed in a different segment of the layout, which is displayed on the local screen. The segments may be the same size or of different sizes. The combinations of the sites displayed on a screen and their association to the segments of the layout may vary among the different sites that participate in the same session. Furthermore, in a continuous presence layout, a received video image from a site may be scaled, up or down, and/or cropped in order to fit its allocated segment size. It should be noted that the terms "conferee," "user," and "participant" may be used interchangeably. In the present disclosure, the term conferee may be used as a representative term for above group.

An MCU may be used to manage a videoconference. An MCU is a conference controlling entity that is typically located in a node of a network or in a terminal that receives several channels from endpoints and, according to certain criteria, processes audio and/or visual signals and distributes them to a set of connected channels.

Example MCUs include the MGC-100 and RMX 2000®, available from Polycom Inc. (RMX 2000 is a registered trademark of Polycom, Inc.). Some MCUs may be composed of two logical units: a media controller (MC) and a media processor (MP). A more thorough definition of an endpoint and an MCU may be found in the International Telecommunication Union ("ITU") standards, including the H.320, H.324, and H.323 standards. Additional information regarding video conferencing standards and protocols such as ITU standards or Session Initiation Protocol (SIP) may be found at the ITU website www.itu.int or in Engineering Task Force (IETF) website www.ietf.org, respectively.

Other video conferencing systems may use a Media Relay Conferencing system, (MRC). In MRC a Media Relay MCU (MRM) receives one or more streams from each participating Media Relay Endpoint (MRE). The MRM relays to each participating endpoint a set of multiple video streams received from other endpoints in the conference. Each receiving endpoint uses the multiple streams to generate the CP video image according to a layout. The CP video image is presented to the MRE's user. An MRE can be a terminal of a conferee in the session which has the ability to receive relayed media from an MRM and deliver compressed media according to instructions from an MRM. MRMs are described in more detail in U.S. Patent Publication No. 2010/0194847, which is incorporated herein by reference in its entirety for all purposes. For purposes of the present disclosure, the terms endpoint and MRE may be used interchangeably.

In some MRC systems, a transmitting MRE sends its video image in two or more layers, levels, of quality. In some systems the two or more layers are carried over a single stream. In other MRC systems, each layer is associated with a different stream. Those systems can provide different window sizes in the layouts, different resolutions used by each receiving endpoint, different frame rate, etc. Furthermore, the plurality of layers can be used for overcoming packet loss. The qualities may differ in frame rate, resolution and/or signal to noise ratio (SNR), etc.

Throughout this disclosure the term video streaming represents any transmission of compressed media (e.g., audio and/or video) in multimedia conferencing sessions, media streaming, or any application using transfer of compressed multimedia streams. The media having been compressed by a scalable-coding encoder. Further, the transmitted compressed media may contain a plurality of layers with the layers differing from each other in quality of the media. The different layers may be handled differently by disclosed embodiments. Also, the term Scalable-Coding (SC) as used herein represents an example of multi-layer media coding.

Video streaming is becoming more and more popular. Further, more and more sources of video streaming as well as video conferencing system deliver a plurality of layers, wherein the layers differ from each other by the quality of the compressed video. The quality can be expressed in number of domains, such as time domain (frames per second, for example), spatial domain (high definition (HD) or common intermediate format (CIF), for example), and/or in quality (sharpness, for example). Video compression standards that are used for video streaming and multi-quality layers include H.264 AVC, H.264 annex G, MPEG-4, etc. Those compression standards can be referred as SC standards. More information on compression standards such as H.264 can be found at the ITU website www.itu.int, or at www.mpeg.org.

Some video compression techniques use two types of frames, an Intra frame and an Inter frame. An Intra frame is a video frame that was compressed relative to information that is contained only within the same frame and not relative to any other frame in the video sequence. An Inter frame is a video frame that was compressed relative to information that is contained within the same frame, and also relative to one or more other frame (reference frames) in the video sequence. An Inter frame can include a predictive frame (a P frame), and/or a bidirectional predictive frame (a B frame). In video conferencing, B frames are not typically used because of the latency they introduce. In the following description an Inter frame is used as a representative term for the term P frame.

The media (e.g., audio and video) of common video conferencing session, which is carried over an Internet Protocol (IP) network, uses Real-time Transport Protocol (RTP) as the transport protocol of the media packets. The RTP protocol is used in conjunction with Real-Time Control Protocol (RTCP). RTCP is used to monitor transmission statistics and quality of service (QoS) and aids synchronization of multiple streams. In addition RTP packets are carried over UDP/IP. It is well known in the art that UDP/IP is a connectionless protocol, which is not reliable and suffers from packet loss. As one of the measures for identifying packet loss, a common RTP processor, at a source of a video conferencing stream, adds a sequence number to each one of the media packets before transmitting them toward their destination.

At the destination of the compressed video stream, an RTP processor sorts the received packets according to their sequence number and delivers the compressed media toward a relevant decoder. In order to overcome packet loss, the RTP processor at both end of the connection may use different forward error correction techniques. Further, the video encoder/decoder at both ends of the connection uses different recovery methods to overcome packet loss. Yet another recovery method can comprise retransmission request for one or more missing packet that are sent toward the source of the stream.

SUMMARY

In real time communication, such as videoconferencing, retransmission may comprise encoding of an Intra frame and transmitting it toward all the endpoints that present that video image, although the retransmitted frame was requested by one of the endpoints. Transmitting of an Intra frame increases the bandwidth consumption over the network and reduces the user experience due to temporary reduction in the frame rate.

Packet loss is typically more prevalent in a session that uses a plurality of media-hops. A media-hop can be an intermediate node between two or more endpoints. For example, a media-hop can be an MCU, an MRM, a media gateway, etc. For the purposes of the present disclosure, the terms MCU, an MRM, a media gateway, and media-hop can be used interchangeably depending on context. In sessions in which a plurality of media-hops are involved, packets can get lost in any segment of the path. Thus, a packet that was lost on the way to a first hop can be requested by the second hop as well as by the one or more consecutive hops including the terminal at the destination of the stream. In such a case a plurality of unnecessary retransmission requests, followed by a plurality of retransmitted packets will load the network and the endpoints at both ends of the connection.

Example embodiments of a method and system, which attempts to enhance the experience of conferees of videoconference session as well as reduce bandwidth consumption by the session, are disclosed. The different methods can be used in media streaming system, in which the media compression technique delivers a plurality of scalable layers. For example, the disclosed technique can be implemented in a video conferencing session in which the video compression is based on SC. An example SC compression standard can be H.264 Annex G commonly referred to as SVC. In SC different layers have different level of importance, because of the dependency between the layers. For example, in temporal scalability, in which three layers are used (T0, T1 and T2), each layer is associated with a different frame rate as it is illustrated in FIG. 1A. The 'X' axis in FIG. 1A represents frames in an RTP stream that are encoded in SC with a frame rate of 30 frames per second (F/s). In order to deliver compressed video in 30 F/s the compressed stream comprises three layers that are transmitted toward a destination.

The first layer is the base layer (BL). For temporal scalability the BL can be referred as T0. BL (T0) comprises compressed frames that are compressed at 7.5 F/s and each frame is compressed based on a reference frame that was created while encoding its preceding frame of the same layer BL (T0). Thus, frame #5, which is the second frame of this layer BL (T0), is compressed based on a reference frame that was created while encoding the first frame of this layer (frame #1). Frame #9, which is the $3^{rd}$ frame of this layer BL (T0) is compressed based on a reference frame that was created while encoding the $2^{nd}$ frame of this layer (frame #5), and so on.

The second layer is the first enhanced layer (EL1). For temporal scalability EL1 can be referred as T1. EL1 (T1) comprises compressed frames that are compressed at 7.5 F/s with a shift of two frames from the first layer BL (T0). Each frame is compressed based on a reference frame that was created while encoding the preceding frame of the first layer BL (T0). Thus, frame #3, which is the 1st frame of layer EL1 (T1) is compressed based on the first frame of layer BL (T0) (frame 1). Frame #7, which is the $2^{nd}$ frame of layer EL1 (T1) is compressed based on the $2^{nd}$ frame (frame 5) of layer BL (T0), and so on. Thus, a stream that comprises frames of layers BL (T0) and EL1 (T1) can be decoded and presented at a frame rate of 15 F/s.

The third layer is the $2^{nd}$ enhanced layer (EL2). For temporal scalability the third layer can be referred as T2. EL2 (T2) can comprise compressed frames that are compressed in 15 F/s, wherein the first frame of this layer, frame 2, is between the first frame of BL (T0), frame 1, and the first frame of EL1 (T1), frame 3. Each odd frame of EL2 (T2) is compressed based on a reference frame that was created while encoding a preceding frame of the first layer BL (T0). Each even frame of EL2 (T2) is compressed based on a reference frame that was created while encoding a preceding frame of the second layer EL1 (T1). Thus, frame #2, which is the 1st frame of layer EL2 (T2) is compressed based on the first frame of layer BL (T0), frame 1. Frame #4, which is the $2^{nd}$ frame of layer EL2 (T2) is compressed based on the $1^{st}$ frame (frame 3) of layer EL1 (T1), and so on. Thus, a stream that comprises frames of layers BL (T0), EL1 (T1) and EL2 (T2) can be decoded and presented at a frame rate of 30 F/s.

Based on the above described methodology of compressing the different layers, a priority between the layers can be allocated. Frames of the base layer, BL (T0), are the most critical frames and can have the highest priority; because decoding of the frames of each of the other two layers, EL1 & EL2 (T1 & T2 for temporal scalability), depends on a preceding frame of BL (T0). Frames of EL1 (T1) are less critical, only the decoding of frames of EL2 (T2) are based on frame of EL1 (T1). In a similar way, frames of EL2 (T2) are less critical than frames of EL1 (T1). Missing a packet that carries compressed data of a frame of EL2 (T2), for example frame 8, reduces the quality of the presented image for a short period of time (~30 msec.) until receiving the next frame, frame 9, which belongs to layer BL (T0). However, if a packet that carries data of frame 13, BL (T0), is lost then enduring artifacts may occur, therefore an Intra frame may be needed in order to recover from the missing packet.

Example embodiments may modify the RTP header of a packet, which carries SC compressed data, to include an extension header. An extension header may include a field that indicates the priority of the compressed video carried by the packet. This field can be referred as PrID field, where Pr0 indicates the highest priority. In some embodiments, a transmitting endpoint (the one that is the source of the compressed stream) can define the priority level. In some embodiments, the priority level can be changed during the session. Changing the priority level can be depended on the frequency of receiving retransmission requests, for example. Packets that carry compressed video data of the base layer, BL (T0), may be marked with the highest priority Pr0. Packets that carry compressed video data of EL2 (T2) may be marked with the lowest priority Pr2. In some sessions in which few retransmission request are received, then the transmitting endpoint may entitle both layers T0 and T1 with the highest priority Pr0. Further, media hops along the path from the source to the destination can be adapted to drop RTP packets having lower priority and transferring RTP packets having higher priority. Example media hops can be media GW, MCU, MRM, bridges etc.

Further, at the destination of an RTP SC packet, the RTP processor may be adapted to respond differently to missing packets with lower priority compared to missing packets of higher priority.

In other example embodiments, the RTP extension header may further comprise new fields that can be associated to sequence numbers. A first sequence number can be incremented, by the source of the stream, per each RTP packet that carries compressed data of Pr0 frame. The value of this field remains unchanged all the way from the source to a receiving endpoint of the RTP packet. This sequence number can be referred as Original-Pr0-Sequence Number (OPr0SN) The OPr0SN enables the RTP processor connected to the decoder of the destination of the SC stream to identify missing Pr0 packets. If a critical packet, such as BL (T0) packet, is found to be missing a request can be made for an I-frame.

A second sequence number can be referred as Hop-Pr0-Sequence Number (HPr0SN). The HPr0SN is replaced by each media-hop along the path of the stream. The HPr0SN enables the RTP processor, connected to the next hop, to identify Pr0 packets that got lost in the last segment prior to that RTP processor. This field is changed from one hop to the next. Each hop can use another sequence counter, thus the values of the HPr0SN can differ dramatically from one hop to another. Each hop increments its sequence number, the value of its HPr0SN, per each transmitted or retransmitted Pr0 packet.

In addition, the RTP processor of each hop can be adapted to check this field. If a critical packet (Pr0), such as BL (T0) packet, is found to be missing by the next RTP receiver, a retransmission request can be sent from the RTP receiver to its sender using the RTCP retransmission request. Using the HPr0SN field for identifying missing critical packets (Pr0) and requesting retransmission of missing critical packets effectively eliminates the overhead traffic of retransmission of low priority missing packets. Further, each hop can be adapted to handle a temporary memory device of transmitted critical packets in order to respond locally to a retransmission request for a critical packet (Pr0) that occurred between its egress and the next RTP receiver. An example temporary memory can store few tens to few hundreds of last transmitted Pr0 packets. An example memory can be a random-access memory (RAM) wherein its address bits can be the last few bits (6, 8 or ten bits for example) of the HPr0SN.

Yet in alternate example embodiments the HPr0SN can be used to count packets of all the layers. In such an embodiment the RTCP of the next hop may respond to a missing packet by requesting retransmission of the missing packet independent of their layer, as long as it occurred in the segment from the preceding hop.

A third sequence number can be referred as Original-Sequence Number (OSN). The OSN is controlled by the source of the compressed stream and will stay un-changed throughout all hops. The OSN is incremented per each transmitted packet independently of its priority, independently on the scalable layer carried by the packet. The OSN enables an RTP processor at the destination of the stream, where the compressed SC stream is decoded, to organize the packets before sending them to a Video decoder.

A person of ordinary skill in the art will appreciate that although the disclosed embodiments are related to temporal scalability; the present disclosure is not limited to temporal scalability and can be implemented on other types of scalability, such as spatial scalability, for example.

Embodiments of the disclosed system can limit the retransmission of missing packets only to packets with high priority (Pr0). Thus the disclosed system and method can reduce the bandwidth consumption and reduce requests for retransmission of Intra frames to improve the conferee's experience.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific example embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

DETAILED DESCRIPTION

Turning now to the figures in which like numerals represent like elements throughout the several views, different embodiments of the present disclosure are described. For convenience, only some elements of the same group may be labeled with numerals. The purpose of the drawings is to describe different embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Figure 1A:
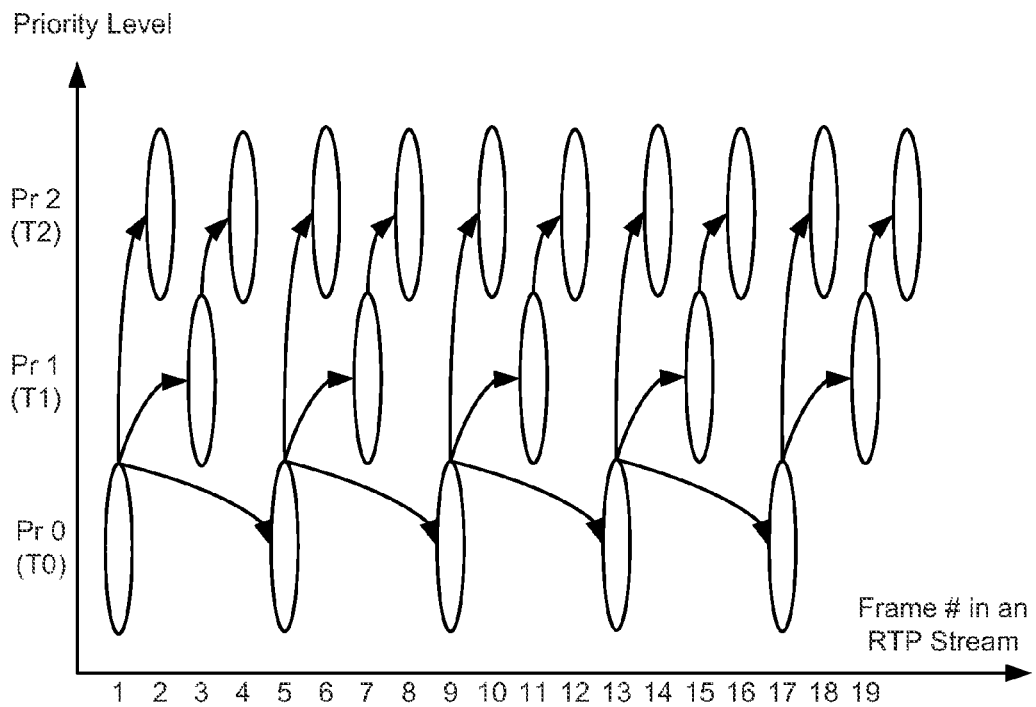
FIG. 1A illustrates an example schematic of a possible SC structure of compressed video stream of 30 F/s while using three layers of temporal scalability according to one or more disclosed embodiments.

FIG. 1A illustrates the relation between compressed frames of an SC compressed video stream of 30 F/s while using three layers of temporal scalability. See discussion of FIG. 1A above.

Figure 1B:
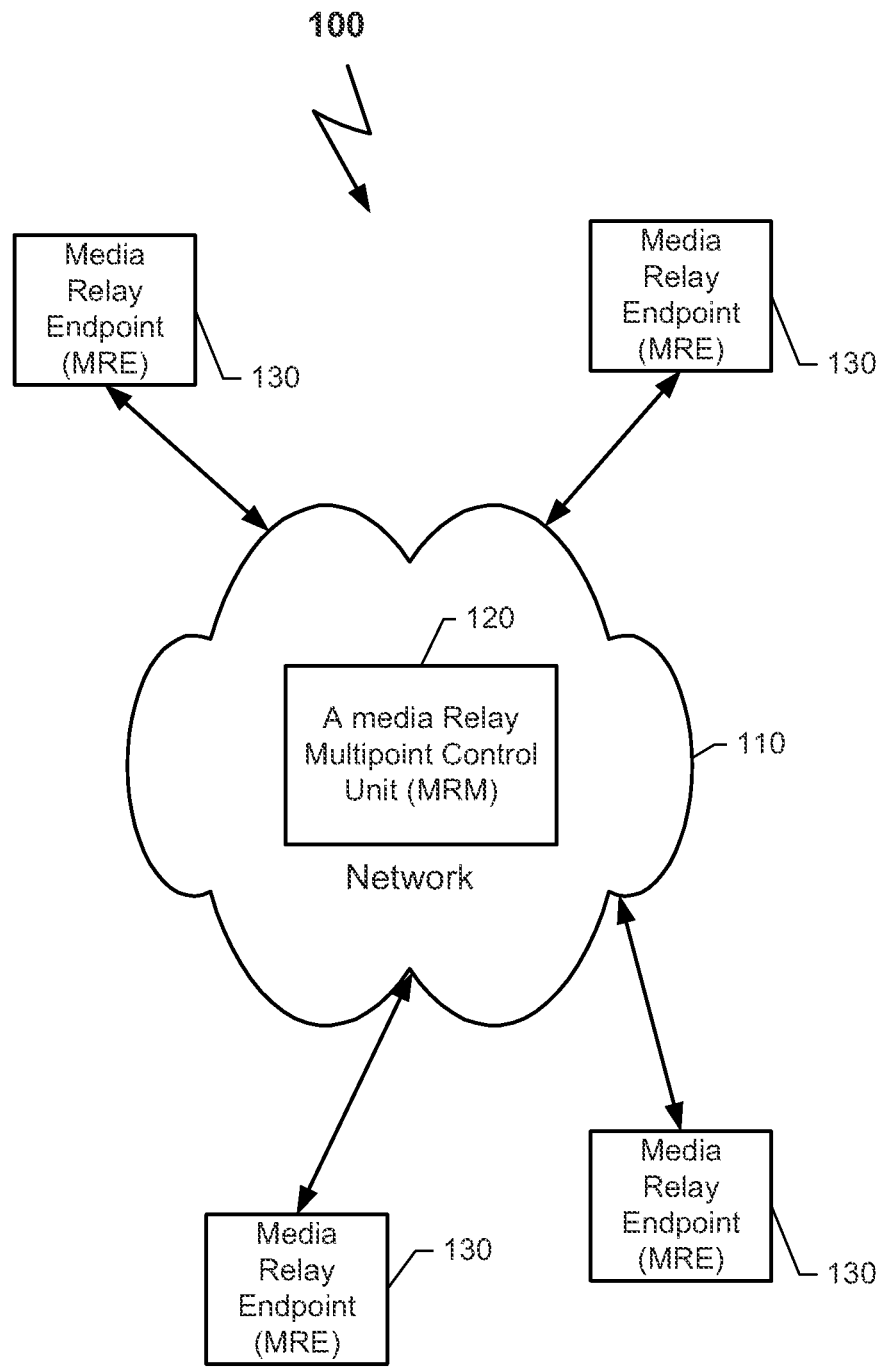
FIG. 1B illustrates a multimedia conferencing system 100 comprising a variety of electronic videoconferencing systems, according to an example embodiment.

FIG. 1B illustrates a multimedia conferencing system 100, according to one embodiment of the present disclosure. System 100 can include a network 110, one or more Media Relay MCUs (MRM) 120, and a plurality of Media Relay Endpoints (MRE) 130. In other embodiments of system 100 the MRM 120 can be a multipoint control unit (MCU), and the plurality of MRE 130 can be video conferencing endpoints (EP). Network 110 can be any packet switched network, an IP network, or any combination thereof. The session management communication can be based on protocols such as H.323, and SIP, the media transport protocol can be based on RTP with RTCP, and may use media compression standards such as audio compression standards G.711 and G.719 and/or video compression standards that are used for video streaming and multi-quality streams: H.264 AVC, H.264 annex G, MPEG-4, etc.

Each EP or MRE 130 is capable of providing real-time, two-way audio and/or visual communication to another endpoint 130 or to the MCU 120. An EP 130 can be a terminal of a conferee in the session, which has the ability to receive compressed media from an MCU and deliver compressed audio and video data according to instructions from the MCU. The common operation of a video conferencing endpoint and an MCU is well known to a person of ordinary skill in the art and therefore will not be further described here.

An example MRE 130 may deliver one or more compressed video streams toward an MRM and may receive one or more selected compressed video streams from an MRM 120. The MRE decodes the received one or more compressed video streams and may compose the decoded stream into a video image that is displayed on the screen of the MRE 130. The MRM 120 is a media relay MCU that receives a plurality of compressed video streams from a plurality of MRE 130, selects one or more sets of compressed video streams and relays the one or more sets of compressed video streams toward a plurality of MREs 130 that participate in the media relay conferencing (MRC) session. A reader who wishes to learn more about an MRE, MRM and MRC is invited to read the US application publication number US 2010/0,194,847, the content of which is incorporate herein by reference.

In addition to common operation of an example EP or MRE 130 as it is disclosed above, EP/MRE 130 can be configured to include two types of RTP processors. One type of RTP processor can be referred as transmitting-endpoint-RTP processor (TERP). Each TERP can be communicatively coupled between an encoder of a video stream (not shown in the drawings) and a network interface card (not shown in the drawings) of the endpoint. An embodiment of TERP can obtain a stream of compressed video Network Abstraction Layer (NAL) data units, aggregate the NAL units into a RTP packet and add an extended RTP header to the RTP packet prior to transferring the RTP packet toward the network interface. In parallel, RTP packets that carry compressed video of the highest priority layer (Pr0) can be stored in a temporary memory. The stored packets can be used for retransmission in case of missing Pr0 packets between the transmitting endpoint and the next media hop (i.e., packet loss).

The extended RTP header can include the fields of the common RTP header. Fields such as sequence number (SN), time stamp, etc. . . . . In addition, the extended RTP header can include an extension of additional four fields that are used by example embodiments of the disclosed techniques. One field, which can be referred as PrID, can indicate the priority level of the compressed video layer carried by the RTP packet, wherein Pr0 indicates the highest priority. Another field can be allocated to a sequence number that can be referred to as Original-Sequence Number (OSN). The OSN will stay unchanged throughout all intermediate media hops. The OSN is incremented, by the TERP, for the first transmission of a packet independently of its priority. The OSN enables an RTP processor at the destination of the stream, in which the compressed SC stream is decoded, to organizing the packets before transferring them toward a video decoder (not shown in the drawings).

A next field can be allocated to another new sequence number that can be incremented per each RTP packet that carries compressed data of a critical frame (Pr0 frame). The value of this field remains unchanged all the way from the TERP of the source EP to a receiving endpoint of the RTP packet. This sequence number can be referred as Original-Pr0-Sequence Number (OPr0SN). The OPr0SN is incremented for each critical (Pr0) RTP packet sent for the first time. The OPr0SN enables the RTP processor connected to the decoder (not shown in the drawings) of the destination of the SC stream to identify missing Pr0 packets. If a critical packet, such as BL (T0) packet, is found to be missing, a request can be made for an Intra frame (I frame).

The fourth field can be allocated for a sequence number that can be referred as Hop-Pr0-Sequence Number (HPr0SN). The HPr0SN can be replaced by each media-hop along the path of the stream. The HPr0SN enables the RTP processor, at the next media-hop, to identify Pr0 packets that got lost in that segment. The HPr0SN value can then be used by that media-hop to request retransmission of the missing one or more critical packets. More detailed information on an embodiment of a TERP is disclosed below in conjunction with FIG. 2A, and FIG. 4.

The second type of RTP processor can be referred as Receiving-endpoint-RTP processor (RERP). An example RERP can be communicatively coupled between a network interface card (not shown in the drawings) of the endpoint and a decoder (not shown in the drawings) of a video stream at the endpoint. An embodiment of RERP can obtain a stream of RTP packets that carry compressed video NAL data units. An embodiment of RERP can parse the extended RTP header. Based on the values HPr0SN the RERP can determine whether a critical packet was lost in the last network segment between the last media hop and the receiving EP. If yes, then a retransmission request can be sent toward the last media hop.

The RERP can organize the received RTP packets according to the OSN field of the extended RTP header and the OPr0SN can be checked in order to determine whether a critical packet is missing, if yes, a request for an Intra frame can be sent toward the encoder (not shown in the drawings) that is the source of that stream. The organized RTP packets can be parsed into compressed NAL data units. The compressed NAL data units can be transferred toward the decoder (not shown in the drawings). An example MRE 130 that is adapted to process the extended RTP header can include a plurality of RERP, one per each stream of a compressed video that is relayed from the MRM 120. More detailed information on an embodiment of a RERP is disclosed below in conjunction with FIG. 2B, and FIGS. 5A-B.

An embodiment of an MCU configured according to the present disclosure can comprise a plurality of RERP modules and a plurality of TERP modules. Each RERP module can be communicatively coupled between a network interface card (not shown in the drawings) which is assigned to an endpoint and an input port (not shown in the drawings) that includes a decoder. The input port is assigned to that endpoint too. Each RERP can perform similar tasks as the RERP unit of an EP as disclosed above. The decoded video from the decoder of the input port can be transferred toward an output port. The output port can obtain decoded video from a plurality of input ports, scale the decoded video and compose a CP video image. The CP video image can be compressed by an SC video encoder of the output port (not shown in the drawings). Each output port can be assigned to a receiving EP.

The NAL data units of the compressed CP video image from each output port can be transferred toward a TERP module that is assigned to the same receiving EP as the output port and communicatively coupled to a network interface card (not shown in the drawings) that is assigned to the same EP. Each TERP can perform similar tasks as the TERP unit of an EP as it is disclosed above.

An embodiment of an MRM 120 that is configured according to the present disclosure can comprise one or more Intermediate-Media-Hop-Receiving-RTP Processor(s) (IMHRRP) and one or more Intermediate-Media-Hop-Transmitting-RTP Processor(s) (IMHTRP). Each IMHRRP can be assigned to a stream of compressed SC video received from an MRE 130 and can be relayed to one or more other MREs. Among other tasks of a common RTP processor, an embodiment of IMHRRP may obtain RTP packets of compressed SC video from the assigned MRE and parse the extended RTP header. Based on the HPr0SN field, it can determine whether a critical packet was lost in the last segment. If yes, the IMHRRP can send a retransmission request to the previous media HOP based on the HPr0SN. An embodiment of an IMHTRP can check the PrID field of the extension header. If the Pr0ID field is Pr0 then the IMHTRP may increment its HPr0SN and replace the value of the HPr0SN field in the RTP header with the new value of the HPr0SN counter of the IMHTRP. If the Pr0ID value is not Pr0 then the HPr0SN counter is not incremented and its previous value is loaded to the HPr0SN field of the extended RTP header. The SN value can be replaced with a new one and the RTP packet can be transferred toward one or more MREs 130. RTP packets that carry compressed video of the highest priority layer (Pr0) can be stored in a temporary memory. The stored packets can be used for retransmission in case of missing Pr0 packets between the MRM 120 and the next media hop or MRE. More detailed information on an MRM 120 is disclosed below in conjunction with FIGS. 3A-B, 6, and 7.

Figure 2A:
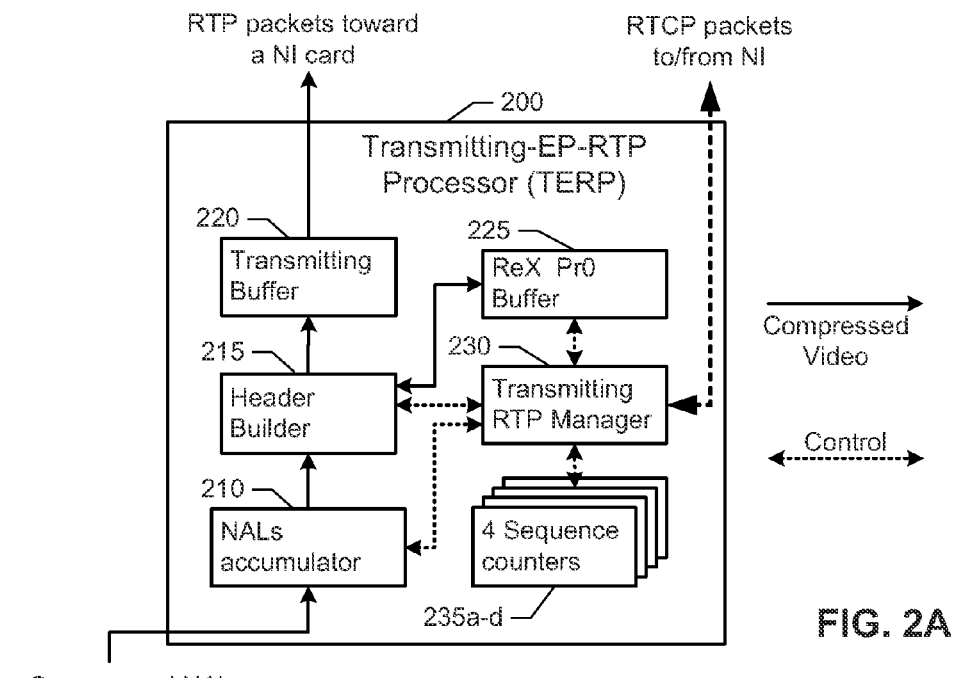
FIG. 2A depicts a block diagram with relevant elements of an example RTP processor of a transmitting endpoint, according to an example embodiment.

FIG. 2A illustrates a block diagram with relevant elements of a Transmitting-EP-RTP-Processor (TERP) 200 of one embodiment of a transmitting EP. An EP can be a common videoconferencing endpoint that receives CP video image from an MCU or an MRE that composes the CP image by itself. Among other elements, an embodiment of an MRE may comprise one or more TERP 200. Each TERP 200 can be associated with an encoder of the MRE (not shown in the drawings). An embodiment of TERP 200 may comprise a NAL accumulator 210, an RTP header builder 215, a transmitting buffer 220, a Retransmission-Pr0 buffer (ReX Pr0 buffer) 225, Transmitting RTP manager 230 and four sequences counters 235a-d. When the relevant EP joins a videoconference, each sequence counter can be set to a randomly generated number, for example.

One sequence counter, 235a, can count the common RTP sequence number, this counter can be referred as LastSN and it can be incremented per each RTP packet that is transmitted from the endpoint for the first time or in response to receiving a retransmission request. The value of LastSN can be written in the SN field of the header of the transmitted RTP packet. Another sequence counter, 235b, can count original RTP packets that were compressed by the associated encoder of the relevant EP (not shown in the drawings). Sequence counter 235b can be referred as LastOSN and it can be incremented per each original (not retransmitted) RTP packet that is transmitted from the endpoint for the first time. The value of LastOSN can be written in the OSN field of the extended header of the transmitted RTP packet. Another sequence counter, 235c, can count original RTP packets that carry compressed data of a Pr0 frame. Sequence counter 235c can be referred as LastOPr0SN and it can be incremented per each original (not retransmitted) RTP packet that carry compressed data of a Pr0 frame and is transmitted from the endpoint for the first time. The value of LastOPr0SN counter can be written in the OPr0SN field of the extended header of the transmitted RTP packet. The last sequence counter, 235d, can count RTP packets that carry compressed data of a Pr0 frame and are transmitted from that EP. This sequence counter 235d can be referred as LastHPr0SN and it can be incremented per each original and retransmitted RTP packet that carries compressed data of a Pr0 frame and is transmitted or retransmitted from the endpoint. The value of LastHPr0SN counter can be written in the HPr0SN field of the extended header of the RTP packet.

An embodiment of TERP 200 may receive a stream of compressed NAL units from its associated encoder (not shown in the drawings). The stream of the NAL units can carry compressed NAL units of two or more levels having different priorities. The obtained stream of NAL units can be aggregated in the NALs accumulator 210 until fulfilling the conditions of the RTP protocol to complete an RTP packet. An example condition for an RTP packet can be a number of bytes to be carried as a payload of the RTP packet; another condition can be the end of a video frame, yet another condition can be a NAL having other priority level, etc. When such a condition occurs, the one or more aggregated NALs can be transferred as a payload of an RTP packet to a queue of header builder 215.

In one embodiment of header builder 215, the common RTP header of the packet, can be added to the payload of the packet. The extension field of the common RTP header can be set to indicate the existence of the extended RTP fields. Among other fields, the common RTP header may include the captured time written in the time stamp field. Next, the value of LastSN counter 235a can be copied to the SN field in the RTP header, etc.

In addition to the common header, the fields of the extended header can be added. The scalable layer of the compression data can be received from the encoder and the priority level of the packet can be defined as, Pr0, Pr1, etc. In one embodiment, the priority level of the packet can be based on the frequency of the received retransmission requests. When a plurality of retransmission requests are received, then only packets that carry the base layer of a compressed frame can be defined as Pr0. When few retransmitting requests were received, then packets that carry compressed layers of the base layer and the first enhance layer can be defined as a Pr0 packet. In some embodiments, the priority level can be changed during the conference session, as a function of the frequency of the retransmission requests. The Pr value can be stored in the Pr field of the extended RTP header.

Further, the values of the three sequence counters, LastOSN, LastOPr0SN and LastHPr0SN (235b, 235c, and 235d, respectively) can be copied to the appropriate fields in the extended RTP header, fields OSN, OPr0SN, HPr0SN, respectively. The composed RTP packet, having the extended RTP header, can be transferred from the header builder 215 via the transmitting buffer 220 toward the network interface card (not shown in the drawings). Wherein the network interface card is associated with that compressed video stream. In parallel, RTP packets that carry compressed video data of a critical frame (Pr0) can be stored in the ReX-Pr0 buffer 225.

ReX-Pr0 buffer 225 can be a RAM device, where each address in the Rex-Pr0 buffer 225 can store an entire RTP packet of Pr0 compressed video with the extended RTP header. The address, in which a Pr0 RTP packet can be stored, can reflect the last few bits of the HPr0SN field of the extended RTP header of the packet. The number of the last few bits can be the last 6-10 bits of HPr0SN field, for example.

The transmitting-RTP manager 230 may manage the entire process of TERP 200. During initiation of the RTP connection, transmitting-RTP manager 230 may allocate and set the four sequence counters 235a-d. Each sequence counter 235a-d can be set to a random number and be incremented according to the nature of the transmitted RTP packets. In some embodiments, one or more sequence counters can be set to a certain number. The LastHPr0SN can be set to zero, for example. In addition the RTP manager can communicate with a RTP manager module of the receiver side of the RTP connection for controlling the RTP connection. The communication with the manager module of the receiving side of the connection can be done by using RTCP communication protocol.

During the conference session RTP manager 230 may receive RTCP retransmission requests from the RTP manager of the receiver. An example of a retransmission request may include a retransmission-request list (ReXReqList). The ReXReqList can have a list of requested Pr0 packets. The list can include the values of the HPr0SN field of the missing critical packets (Pr0). Based on the ReXReqList RTP manager 230 may search the ReX-Pr0 buffer 225 looking for packets that have the same HPr0SN value. If the requested Pr0 packets are stored in ReX-Pr0 buffer 225, then those packets can be retrieved from the ReX-Pr0 buffer 225 and can be transferred toward Header Builder 215.

In Header Builder 215 the fields of the SN and HPr0SN can be updated according to the current values of the LastSN 235a and LastHPr0SN 235d counters. The values of the OSN and OPr0SN fields of the extended RTP header can remain without changes. Then the LastSN 235a and LastHPr0SN 235d counters can be incremented and the requested packets can be retransmitted via transmitting buffer 220. If one or more requested Pr0 packets do not exist in ReX-Pr0 buffer 225, then an Intra request can be sent by the RTP manager 230 to the associated encoder (not shown in the drawings). More information on the operation of TERP 200 is disclosed below in conjunction with FIG. 4.

Figure 2B:
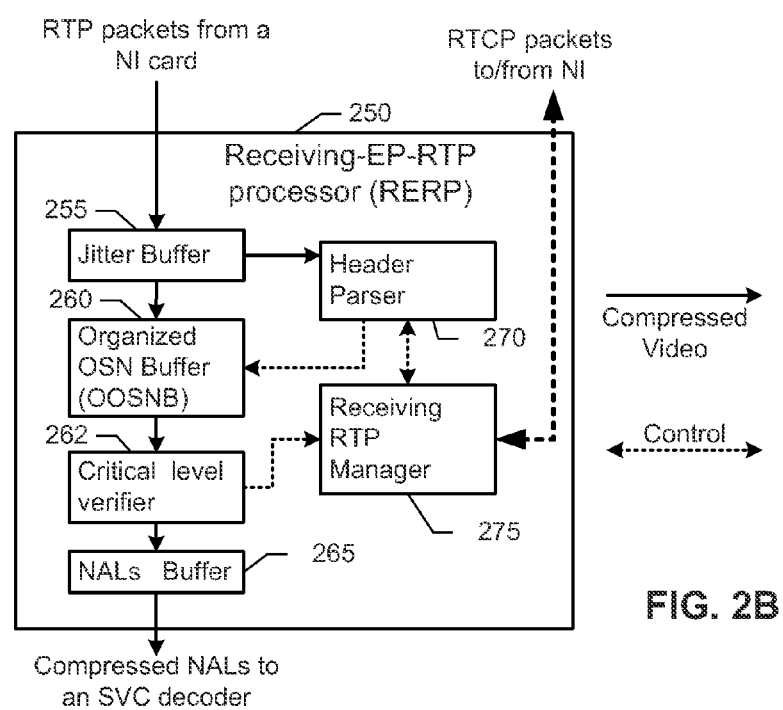
FIG. 2B depicts a block diagram with relevant elements of an example RTP processor of a receiving endpoint, according to an example embodiment.

Referring now to FIG. 2B, a block diagram is shown with relevant elements of an embodiment of Receiving-EP-RTP Processor (RERP) 250. A receiving EP can be a common videoconferencing endpoint that receives CP video image from an MCU or an MRE that composes the CP image by itself. Among other elements, an embodiment of an MRE may comprise one or more RERP 250. Each RERP 250 can be associated with a receiving compressed stream from a transmitting MRE, directly or via an MRM for example, and a decoder (not shown in the drawings) for decoding the received stream. An embodiment of RERP 250 may comprise a Jitter Buffer 255, an Organized-OSN buffer (OOSNB) 260, a Critical-Layer Verifier 262, a NAL Buffer 265, an RTP header parser 270 and a Receiving-RTP manager 275.

An embodiment of RERP 250 may obtain a stream of RTP packets carrying compressed video NAL data units from a network interface card (not shown in the drawings) associated with the relevant stream. The obtained RTP packets can be stored in Jitter Buffer 255. Header Parser 270 may parse the extended RTP header of the RTP packets stored in Jitter Buffer 255. Based on the value of the extended fields PrID and the HPr0SN, a decision can be made as to whether one or more Pr0 critical packets were lost in the path from the last media hop. If a gap in the HPr0SN is detected then a request with a list for retransmission of one or more missing-Pr0 packets can be sent via the receiving-RTP manager 275 toward the transmitting RTP manager 230 (FIG. 2A) of the transmitting EP.

RTP packets from Jitter Buffer 255 can be transferred and stored in the OOSNB 260 based on the value of their OSN extended field. An embodiment of the critical level verifier 262 can obtain a next packet from the OOSNB 260, based on its OSN value, and then the value of the OPr0SN field of the extended RTP header can be checked for determining whether a critical packet (Pr0) is missing. If a gap in the OPr0SN is detected then a request for an Intra frame can be sent toward the associated encoder (not shown in the drawings) of the transmitting EP via the receiving-RTP manager 275 using the RTCP connection. Then, the obtained RTP packet can be decomposed to one or more NAL units and the NAL units can be stored in the NAL buffer 265. Based on their order in the NAL buffer 265, the NAL units can be obtained by an associated decoder, not shown in the drawings. In a common endpoint the associated decoder can decode the received compressed CP video image and the decoded CP video image can be displayed on the EP display unit (not shown in the drawings). In an MRE, the decoded video image from the associated decoder can be transferred toward a CP image builder (not shown in the drawings) where it can be placed in a segment of the CP video image and be presented as part of the CP video image over the MRE display unit.

The receiving-RTP manager 275 may manage the entire process of RERP 250. During initiation of the RTP connection, receiving-RTP manager 275 may allocate and set the resources of the RERP 250. In addition the receiving-RTP manager 275 can communicate with a transmitting-RTP manager module of the transmitting side of the RTP connection via an RTCP connection to control the RTP connection. The transmitting side can be an EP, an MRE an MCU or an MRM, for example.

During the conference session, the receiving-RTP manager 275 may send RTCP retransmission requests toward the transmitting-RTP manager of the transmitting side. An example of a retransmission request may include a retransmission-request list (ReXReqList). The ReXReqList can have a list of requested Pr0 packets. The list can include the values of the HPr0SN field of the missing critical packets (Pr0). In addition the receiving-RTP manager 275 can send a request for an Intra frame if a missing critical packet is detected before transferring the compressed video toward the associated decoder (not shown in the drawings). More information on the operation of RERP 250 is disclosed below in conjunction with FIG. 5A-B.

An MCU is an example of a media hop that receives a plurality of compressed video streams from a plurality of EPs; decodes the compressed streams; composes one or more CP video images; compresses the one or more CP video images and transmits the one or more compressed CP video images toward a plurality of EPs. Such an MCU can be adapted according to an embodiment of the disclosed techniques. An embodiment of such an MCU may comprise a plurality of RERP 250. Each RERP 250 can be communicatively located between a network interface card and a decoder that are associated with a compressed video stream from an EP. In addition, the embodiment of the MCU may comprise a plurality of TERP 200. Each TERP 200 can be communicatively located between an encoder and a network interface card that are associated with a compressed CP video stream which is transmitted toward one or more EPs.

Figures 3A, 3B:
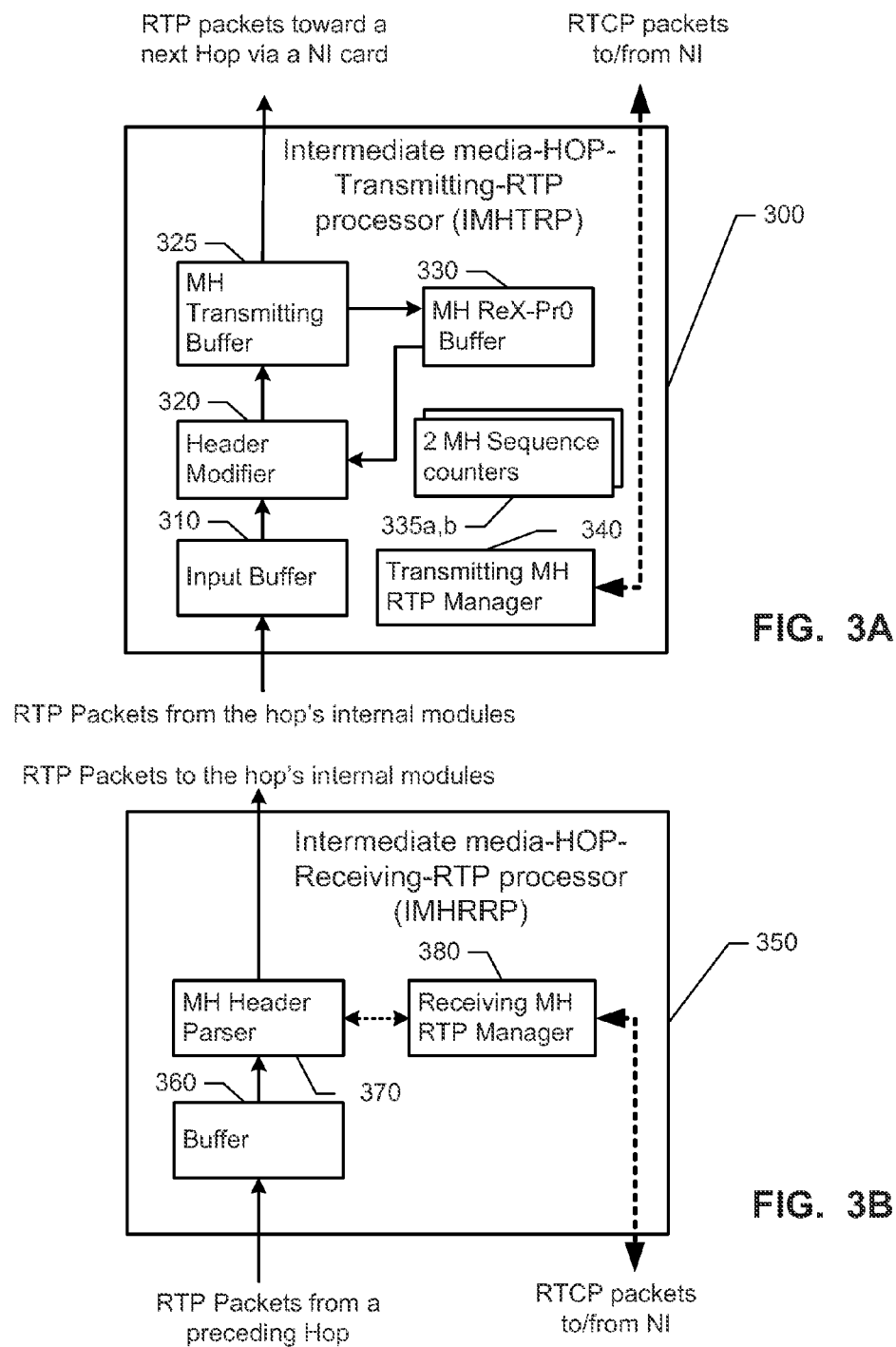
FIG. 3A depicts a block diagram with relevant elements of an embodiment of a transmitting-RTP processor of an intermediate-media hop, according to an embodiment of an intermediate-media hop.
FIG. 3B depicts a block diagram with relevant elements of an embodiment of a receiving-RTP processor of an intermediate-media hop, according to an embodiment of an intermediate-media hop

FIG. 3A depicts a block diagram with relevant elements of an embodiment of an intermediate-media-hop-transmitting-RTP processor (IMHTRP) 300, according to an embodiment of an intermediate-media hop. An intermediate-media-hop can be an MRM that relays a plurality of compressed video streams from and to a plurality of MREs. Among other elements, an embodiment of an MRM may comprise one or more IMHTRP 300. Each IMHTRP 300 can be associated with an RTP connection between an MRM and an MRE. An embodiment of IMHTRP 300 may comprise an input buffer 310, an RTP header modifier 320, a Media-Hop (MH) transmitting buffer 325, a MH Retransmission-Pr0 buffer (ReX Pr0 buffer) 330, a Transmitting-MH-RTP manager 340 and two MH sequences counters 335a,b. When the relevant RTP is established, each MH sequence counter 335a,b can be set to a randomly generated number, for example. In some embodiments, one or more sequence counters can be set to a certain number. The LastHPr0SN can be set to zero, for example.

One MH sequence counter, 335a, can count the common RTP sequence number, this counter can be referred as LastSN and it can be incremented per each RTP packet that is transmitted from IMHTRP 300 for the first time or in response to receiving a retransmission request. The value of LastSN can be written in the SN field of the header of the transmitted RTP packet. Another sequence counter, 235b, can count RTP packets that carry compressed data of a critical frame (Pr0 frame) and are transmitted from IMHTRP 300. This sequence counter 235b can be referred as LastHPr0SN and it can be incremented per each original and retransmitted RTP packet that carry compressed data of a Pr0 frame transmitted or retransmitted from the IMHTRP 300. The value of LastHPr0SN counter can be written in the HPr0SN field of the extended header of the transmitted RTP packet.

An embodiment of IMHTRP 300 may receive a stream of compressed RTP packets from the internal elements (not shown in the drawings) of the intermediate-media-hop and are targeted toward the relevant RTP connection. The stream of the RTP packets can carry compressed NAL units of two or more layers having different priorities. The obtained RTP packets can be stored in input buffer 310, from which each RTP packet can be fetched by the header modifier 320.

In one embodiment of header modifier 320, the RTP header of the packet, can be modified. The value of MH LastSN counter 335a can be written in the SN field in the RTP header instead of the previous value, etc. The value of sequence counter MH LastHPr0SN 335*b* can be written to the HPr0SN field in the extended RTP header instead of the previous value. Modifying the HPr0SN field can be done the first time the packet is transmitted toward the relevant connection or for retransmission packet. The RTP packet, having the extended RTP header, can be transferred from the header modifier 320 via the MH transmitting buffer 325 toward the network interface card (not shown in the drawings). The network interface card can be associated with that relevant RTP connection. In parallel, RTP packets that carry compressed video data of a critical frame (Pr0) can be stored in the MH ReX-Pr0 buffer 330.

MH ReX-Pr0 buffer 330 can be a RAM device, where each address in the RAM of MH ReX-Pr0 buffer 330 can store an entire RTP packet of Pr0 compressed video with the extended RTP header. The address, in which a Pr0 RTP packet can be stored, can reflect the last few bits of the HPr0SN field of the extended RTP header of the packet. The number of the last few bits can be the last 6-10 bits of HPr0SN field, for example.

Transmitting-MH-RTP manager 340 may manage the entire process of IMHTRP 300. During initiation of the RTP connection, transmitting-MH-RTP manager 340 may allocate and set the two MH sequence counters 335*a,b*. Each MH sequence counter 335*a,b* can be set to a random number or to zero and be incremented according to the nature of the transmitted RTP packets. In addition MH RTP manager 340 can communicate with a RTP manager module of the receiver side of the RTP connection for controlling the RTP connection. The communication with the manager module of the receiving side of the connection can be done using RTCP communication protocol.

During the conference session, MH RTP manager 340 may receive RTCP retransmission requests from the RTP manager of the receiver side of the connection. An example of a retransmission request may include a retransmission-request list (ReXReqList). The ReXReqList can have a list of requested Pr0 packets. The list can include the values of the HPr0SN field of the missing critical packets (Pr0). Based on the ReXReqList, MH RTP manager 340 may search MH ReX-Pr0 buffer 330 looking for packets that have the same HPr0SN value. If requested Pr0 packets are stored in MH ReX-Pr0 buffer 330, then those packets can be retrieved from MH ReX-Pr0 buffer 330 and transferred toward Header modifier 320.

In Header modifier 320 the fields of the SN and HPr0SN can be updated according to the current values of the MH LastSN 335*a* and MH LastHPr0SN 335*b* counters. The values of the OSN and OPr0SN fields of the extended RTP header remain without changes. Then the MH LastSN 335*a* and MH LastHPr0SN 335*b* counters can be incremented and the requested packets can be retransmitted via MH transmitting buffer 325. If one or more requested Pr0 packets do not exist in MH ReX-Pr0 buffer 330, then an Intra request can be sent by the MH RTP manager 340 toward an endpoint that originated the relevant stream. In some embodiments, one or more sequence counters can be incremented before updating the relevant field in the RTP header. More information on the operation of IMHTRP 300 is disclosed below in conjunction with FIG. 7.

Referring now to FIG. 3B a block diagram is shown with relevant elements of an embodiment of Intermediate-Media-Hop-Receiving-RTP processor (IMHRRP) 350. An intermediate-media-hop can be an MRM that relays a plurality of compressed video streams from and to a plurality of MREs. Among other elements, an embodiment of an MRM may comprise one or more IMHRRP 350. Each IMHRRP 350 can be associated with an RTP connection between the MRM and a transmitting MRE or another MRM along the path. An embodiment of IMHRRP 350 may comprise a buffer 360, an MH-RTP-header parser 370 and an MH-Receiving-RTP manager 380.

An embodiment of IMHRRP 350 may obtain a stream of RTP packets carrying compressed video NAL data units from a network interface card (not shown in the drawings) associated with the relevant RTP connection. The obtained RTP packets can be stored in buffer 360. Buffer 360 can be a cyclic memory, for example, that stores a plurality of obtained RTP packets.

MH-Header Parser 370 may fetch a next RTP packet from buffer 360, parse the extended RTP header of the fetched RTP packet and transfer the fetched RTP packet toward the internal units (not shown in the drawings) of the intermediate media hop.

Based on the value of the extended fields PrID and the HPr0SN an embodiment of MH-header parser 370 may determine whether a Pr0 packet, a critical packet, was lost in the last segment of the path from the transmitting MRE or MRM.

If a gap in the HPr0SN is detected, receiving-MH-RTP manager 380 can determine which one or more critical packets are missing and a request with a list for retransmission of the one or more missing-Pr0 packets can be sent via the receiving-MH-RTP manager 380 over the RTCP connection toward the transmitting RTP manager 230 (FIG. 2A) of the transmitting MRE or the transmitting MH RTP manager 340 of the previous intermediate MH.

Receiving-MH-RTP manager 380 may manage the entire process of IMHRRP 350. During initiation of the RTP connection, receiving-MH-RTP manager 380 may allocate and set the resources of the IMHRRP 350. In addition receiving-MH-RTP manager 380 can communicate with a transmitting-RTP manager module 230 (FIG. 2A) or transmitting-MH-RTP manager 340 of the transmitting side of the RTP connection via an RTCP connection in order to control the RTP connection.

During the conference session, receiving-MH-RTP manager 380 may send RTCP retransmission requests toward the transmitting-RTP manager 230 or 340 of the transmitting EP or media hop (respectively). An example of a retransmission request may include a retransmission-request list (ReXReqList). The ReXReqList can have a list of requested Pr0 packets. The list can include the values of the HPr0SN field of missing critical packets (Pr0). More information on the operation of IMHRRP 350 is disclosed below in conjunction with FIG. 6.

Figure 4:
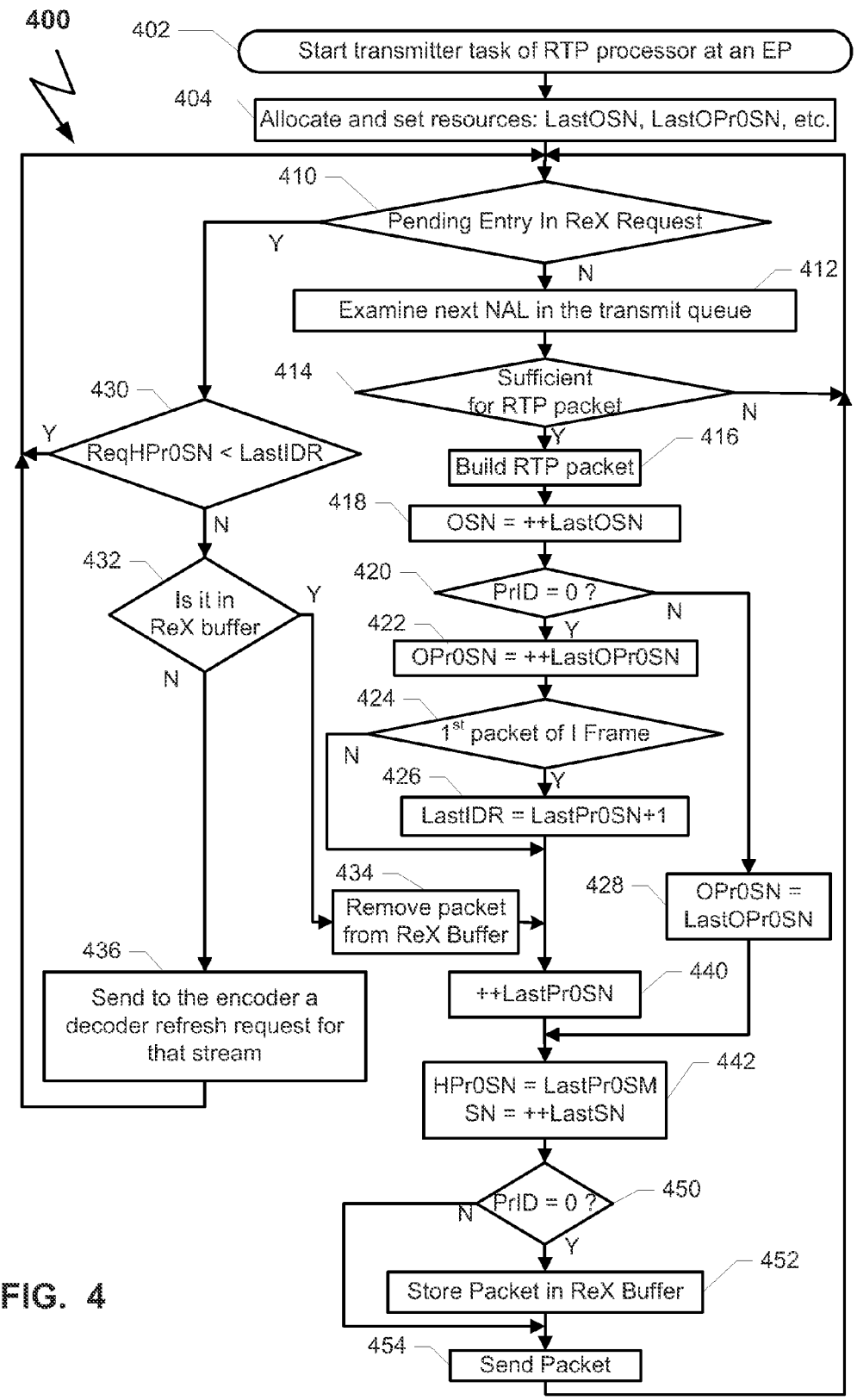
FIG. 4 illustrates a flowchart with relevant blocks of a transmitting task of an embodiment of a Transmitting-EP-RTP-Processor.

Referring now to FIG. 4, a flowchart is shown with relevant blocks of a transmitting task 400 of a Transmitting-EP-RTP-Processor (TERP) 200. TERP 200 can be associated with an EP or an MRE that is a source of a compressed SC stream that is transferred over an RTP connection associated with the TERP 200. Method 400 can be initiated 402 during establishment of the RTP connection between a transmitting EP/MRE and a next media hop. The RTP connection can be initiated during establishment of the conference session or upon joining an ongoing session.

After initiation, resources of TERP 200 can be allocated 404 and set. For example, the four sequence counters 235*a-d* (FIG. 2A) can be allocated. Each counter (LastSN, LastOSN, LastOPr0SN, and LastHPr0SN) can be set to a random number or zero, for example. In addition, buffers such as but not limited to ReX-Pr0 buffer 225 (FIG. 2A), can be allocated and reset, registers such as LastIDR can be allocated and reset, etc.

Next transmitting-RTP manager 230 (FIG. 2A) may check 410 whether an entry in a ReX request list exist in its queue.

If not, method 400 can proceed to block 412. If 410 a ReX request exists, then the request can be retrieved and the entry cleared, the retrieved request can be parsed and a decision can be made 430 as to whether the value of the requested HPr0SN, is less than the value stored in the LastIDR register. The LastIDR register stores the value of HPr0SN field of a first packet that carries the beginning of an Intra Pr0 frame. If 430 the value is smaller, indicating that an Intra frame was already sent after the compressed Pr0 video data carried by the missing packet, there is no need for retransmission of the missing packet and method 400 can return to block 410.

If 430 the value is not smaller, then ReX-Pr0 buffer 225 (FIG. 2A) can be checked 432 and a decision can be made whether the Pr0 requested packet exist in ReX-Pr0 buffer 225. If the requested packet does not exist in ReX-Pr0 buffer 225, then a decoder refresh request (an Intra request) is sent 436 toward the encoder of the relevant stream and method 400 returns to block 410. If 432 the Pr0 packet, which is mentioned in the requested list, exists in ReX-Pr0 buffer 225, then the requested Pr0 packet is fetched and removed 434 from ReX-Pr0 buffer 225 and method 400 proceeds to block 440 for handling the fetched requested packet.

Returning now to block 410, if there are no more entries in the ReX request list, then the NALs accumulator 210 (FIG. 2A) can be examined 412 in order to determine whether 414 there are sufficient bytes for a payload of an RTP packet. If 414 there are not enough bytes, then method 400 can return to block 410 for enabling aggregating additional NAL units from the relevant encoder. If 414 there are sufficient bytes for a payload of an RTP packet, then the payload is assembled by fetching NAL units from the NALs accumulator 210 and the payload is transferred to the header builder 215 (FIG. 2A) for assembling the RTP header as well as the extended header to the payload for building 416 an RTP packet. The PrID can be set according to information received from the encoder.

The value of the OSN sequence counter, LastOSN, can be incremented and the new value of LastOSN can be written 418 in the OSN field of the extended RTP header. Next, a decision is made 420 whether the content of the payload comprises compressed video of a Pr0 frame, a critical frame. If not, then the value of the LastOPr0SN remains as is and its value is copied 428 to the OPr0SN field of the extended RTP header and method 400 proceeds to block 442.

If 420 the payload of the RTP packet carries compressed data of a critical frame, then the value of the LastOPr0SN counter is incremented 422 and the new value is copied to the OPr0SN field of the extended RTP header. Next, based on parsed header of the compressed video data a decision is made 424 whether the RTP packet carries the beginning of an Intra frame. If not, method 400 can proceed to block 440. If yes, then the value of the sequence counter LastPr0SN plus one is copied 426 to register LastIDR, which is used in block 430 for handling a request for retransmission, and method 400 can proceed to block 440.

At block 440 the sequence counter LastPr0SN is incremented. The value of sequence counter LastPr0SN is copied 442 to the HPr0SN field of the extended RTP header and the sequence counter LastSN is incremented 442 and the new value of LastSN is copied to SN field of the RTP header.

Based on the Pr0ID field of the extended RTP header a decision is made 450 whether the packet carries data of a critical frame. If 450 not, then method 400 proceeds to block 454 and transmits the new RTP packet toward a next media hop via a network interface card (not shown in the drawings) and over the relevant RTP connection. After sending the RTP packet, method 400 returns to block 410 starting a new cycle. If 450 the packet carries data of a critical frame, then method 400 stores 452 a copy of the RTP packet in ReX Pr0 buffer 225 (FIG. 2A) and transmits 454 the new RTP packet toward a next media hop via a network interface card (not shown in the drawings) and over the relevant RTP connection. Then, method 400 returns to block 410 starting a new cycle. In some embodiments of RTER 200 (FIG. 2A) the address, in which the RTP packet is stored in ReX Pr0 buffer 225, can reflect the value of the HPr0SN field of the extended RTP header of the packet.

Figure 5A:
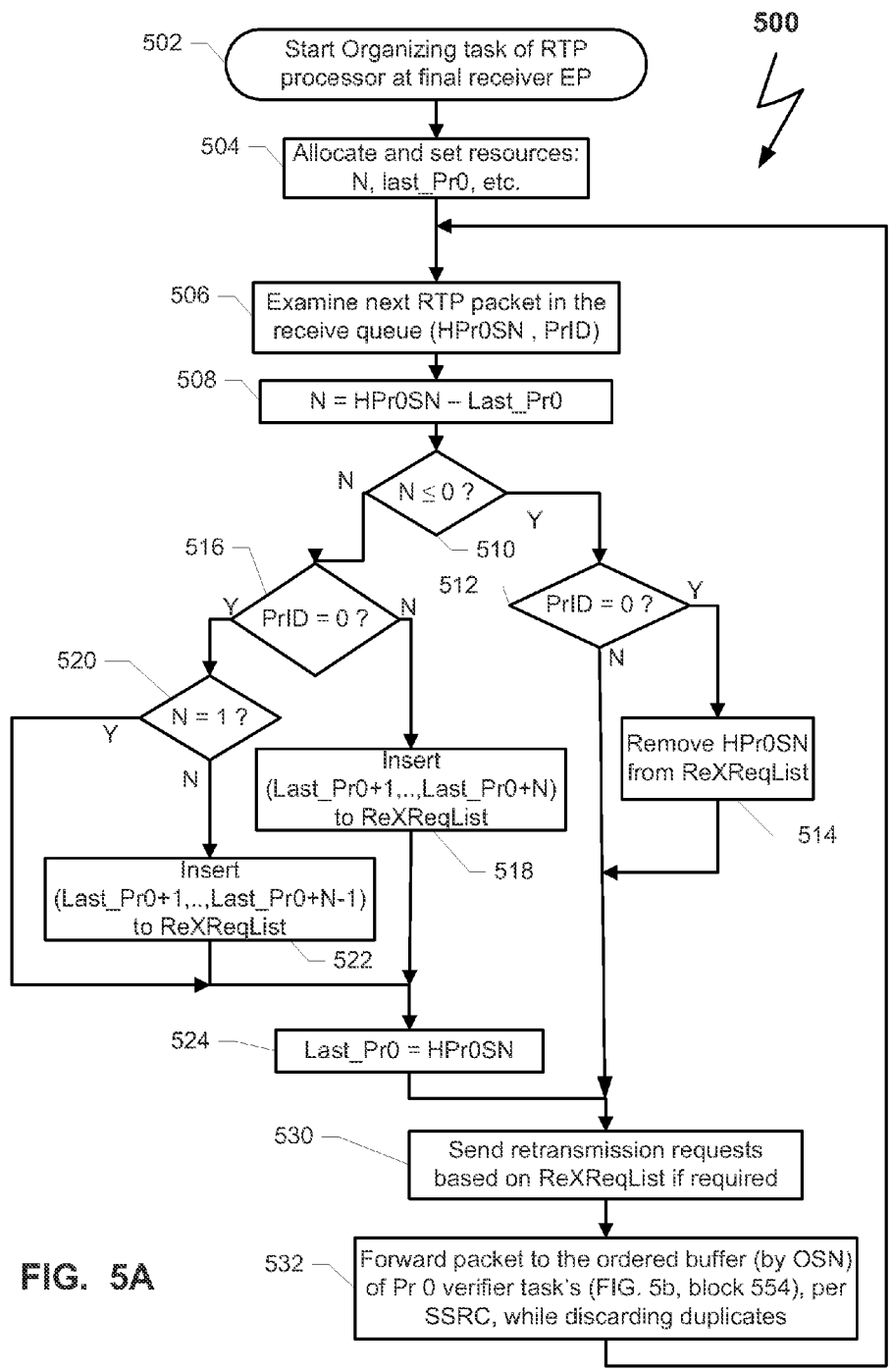
FIGS. 5A-B illustrate flowcharts with relevant blocks of a receiving method that can be implemented by a receiving section of an example RTP processor of at a destination endpoint of compressed SC stream.

FIG. 5A illustrates a flowchart with relevant blocks of an example organizing method 500. Organizing method 500 can be implemented by an embodiment of a Receiving-EP-RTP-Processor (RERP) 250. RERP 250 can be associated with a receiving EP or a receiving MRE at a destination of a compressed SC stream that is transferred over an RTP connection associated with the RERP 250. Method 500 can be initiated 502 during establishment of the RTP connection between the receiving EP/MRE and a previous media hop. The RTP connection can be initiated during establishment of the conference session or upon joining of the receiving EP to an ongoing session.

After initiation, resources of RERP 250 can be allocated 504 and set. Resources such as but not limited to OOSNB 260 (FIG. 2B), NALs buffer 262, Jitter Buffer 255, register N, register Last_Pr0 etc., can be allocated and reset.

A next received RTP packet from Jitter Buffer 255 (FIG. 2B) can be fetched. The extended RTP header of the packet can be parsed 506 and the values of the HPr0SN and PrID fields can be retrieved. The difference between the retrieved value of HPr0SN and the value written in the register Last_Pr0 can be calculated 508 and the result can be stored in the register 'N'.

After storing the value of the difference in 'N' a decision may be made 510 whether the value of 'N' is less than or equal to zero. If the value is less than or equal to zero, indicating that the packet was received out of order over the path from the last media hop and the receiving EP, then another decision can be made 512 whether the value of the fetched PrID is zero, indicating that the current packet carries data of a critical frame. If 512 yes, then a retransmission request list (ReXReqList) can be examined 514 and a request for retransmission RTP packet having the same value of HPr0SN can be removed from the retransmission request list. Then method 500 can proceed to block 530. If 512 the value of the fetched PrID is not zero, indicating that it is not a critical packet, then method 500 can proceed to block 530.

At block 530 a retransmission request based on the ReXReqList can be sent over an RTCP connection from the Receiving RTP manager 275 (FIG. 2B) to the RTP manager over the other side of the RTCP connection. Then the received RTP packet can be forwarded 532 to the OOSNB 260 (FIG. 2B) to be handled by method 5000 (FIG. 5B) and method 500 returns to block 506.

In some embodiments, the list can be cleared each time an Intra frame is received, or based on the age of each entry in the list, etc. Yet in some embodiments, at block 532 duplicated packets, packets having the same OSN, can be discarded from the OOSNB 260 (FIG. 2B).

Returning now to block 510, if the value of 'N' is greater than zero, then a decision can be made whether 516 the value of the fetched PrID is zero, indicating that the current packet carries data of a critical frame. If at 516 PrID is not zero, indicating that one or more critical packets were missed along the last segment from the previous media hop, then the ReXReqList can be updated 518. The update can be done by writing a list of requested packets that the value of their HPr0SN field of the extended RTP header is equal to the value stored in Last_Pr0 register plus 1, plus 2, plus 3 . . . up to plus the value stored in register 'N'. After updating the ReXReqList, the value of the HPr0SN field of the extended RTP header of the current received RTP packet is stored 524 instead of the previous value of register Last_Pr0 and method 500 proceed to block 530.

If 516 the value of the fetched PrID is zero, indicating that the current packet carries data of a critical frame, then another decision can be made 520 whether the value of 'N' is equal to one. If 520 yes, indicating that no critical packet was lost, then process 500 can proceed to block 524. If 520 not, indicating that one or more critical packets were missed up to this one, thus the ReXReqList can be updated 522. The update can be done by writing a list of requested packets that the value of their HPr0SN field of the extended RTP header is equal to the value stored in Last_Pr0 register plus 1, plus 2, plus 3 . . . up to plus the value stored in register 'N' minus one. After updating the ReXReqList, the value of the HPr0SN field of the extended RTP header of the current received RTP packet is stored 524 instead of the previous value of register Last_Pr0 and method 500 proceed to block 530.

Figure 5B:
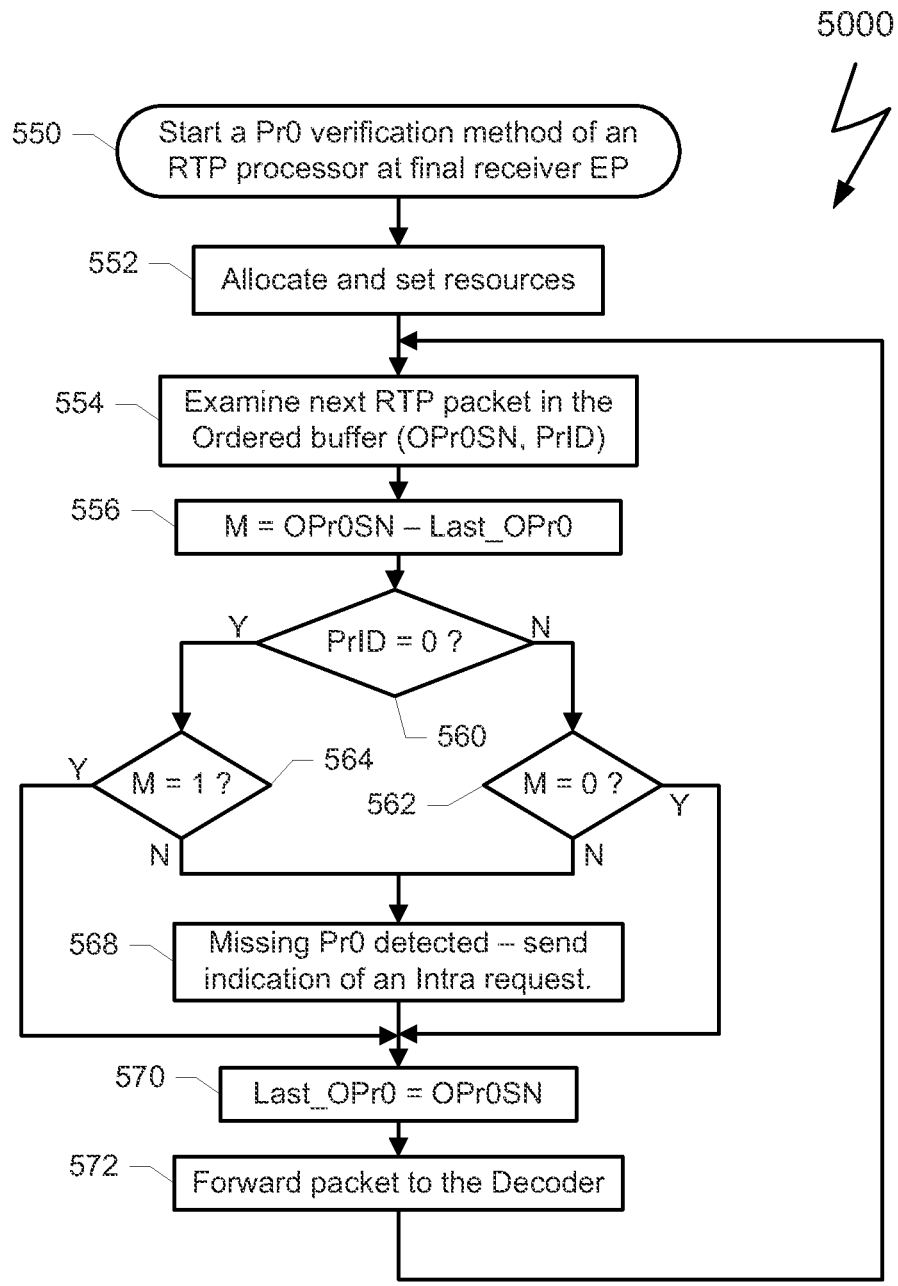

FIG. 5B illustrates a flowchart with relevant blocks of an example of an embodiment of Pr0 verification method 5000. Pr0 verification method 5000 can be implemented by an embodiment of a Receiving-EP-RTP-Processor (RERP) 250. RERP 250 can be associated with a receiving EP or a receiving MRE at a destination of a compressed SC stream that is transferred over an RTP connection associated with the RERP 250. Method 5000 can be initiated 550 during establishment of the RTP connection between the receiving EP/MRE and a previous media hop. The RTP connection can be initiated during establishment of the conference session or upon joining the receiving EP to an ongoing session.

After initiation, resources of RERP 250 that are related to method 5000 can be allocated 552 and set. Resources such as but not limited to: critical level verifier 262 (FIG. 2B), registers and buffers such as but not limited to OOSNB 260 (FIG. 2B), NALs buffer 262, a register M, a register Last_OPr0 etc., can be allocated and reset.

A next received RTP packet from the OOSNB 260 (FIG. 2B) can be fetched. The extended RTP header of the packet can be parsed 554 and the values of the OPr0SN and PrID fields can be retrieved. The difference between the retrieved value of OPr0SN and the value written in the register Last_OPr0 can be calculated 556 and the result can be stored in the register 'M'.

After writing the value of the difference in register 'M', a decision may be made 560 whether the value of the fetched PrID is zero, indicating that the current packet carries data of a critical frame. If 560 yes, then another decision can be made 564 whether the value of 'M' is equal to one. If 564 yes, indicating that there is no missing critical packet from the original source of the received compressed video stream up to the receiving destination of the compressed video stream, then the value of the OPr0SN field of the extended RTP header of the current received RTP packet is written 570 instead of the previous value of register Last_OPr0 and method 5000 proceed to block 572. At block 572 the received RTP packet can be forwarded to the NALs buffer 265 (FIG. 2B) from which it can be transferred toward a decoder of the receiving EP. The decoder can handle the compressed video stream, which was carried over the relevant RTP connection. Then, method 5000 returns to block 554 for handling the next RTP packet in OOSNB 260.

If 560 the value of the fetched PrID is not zero, indicating that the current packet is not a critical one, then another decision can be made 562 whether the value of 'M' is equal to zero. If 562 yes, indicating that there is no missing critical packet from the original source of the received compressed video stream up to the receiving destination of the compressed video stream, then the value of the OPr0SN field of the extended RTP header of the current received RTP packet is written 570 instead of the previous value of register Last_OPr0 and method 5000 proceeds to block 572. At block 572 the received RTP packet can be forwarded to the NALs buffer 265 (FIG. 2B) from which it can be transferred toward a decoder of the receiving EP. The decoder can handle the compressed video stream, which was carried over the relevant RTP connection. Then, method 5000 returns to block 554 for handling the next RTP packet in OOSNB 260.

Returning now to block 564 or block 562, if the value of register 'M' is not equal to one or zero, respectively, indicating that one or more critical packets are missing and a request for an Intra frame can be sent 568 by the Receiving RTP manager 275 (FIG. 2B). The Intra request can be sent toward the transmitting RTP manager, of the source of the relevant compressed video stream, over the RTPC connection. The Intra request can be transferred via one or more intermediate media hops. Then, method 5000 can proceed to block 570.

In some embodiments of method 5000, after forwarding 572 the RTP packet toward the decoder, the process can wait for a period of time in order to overcome jitter within a transmitted frame. The waiting period can be in the range of few milliseconds, between 5 to 20 milliseconds, for example.

Figure 6:
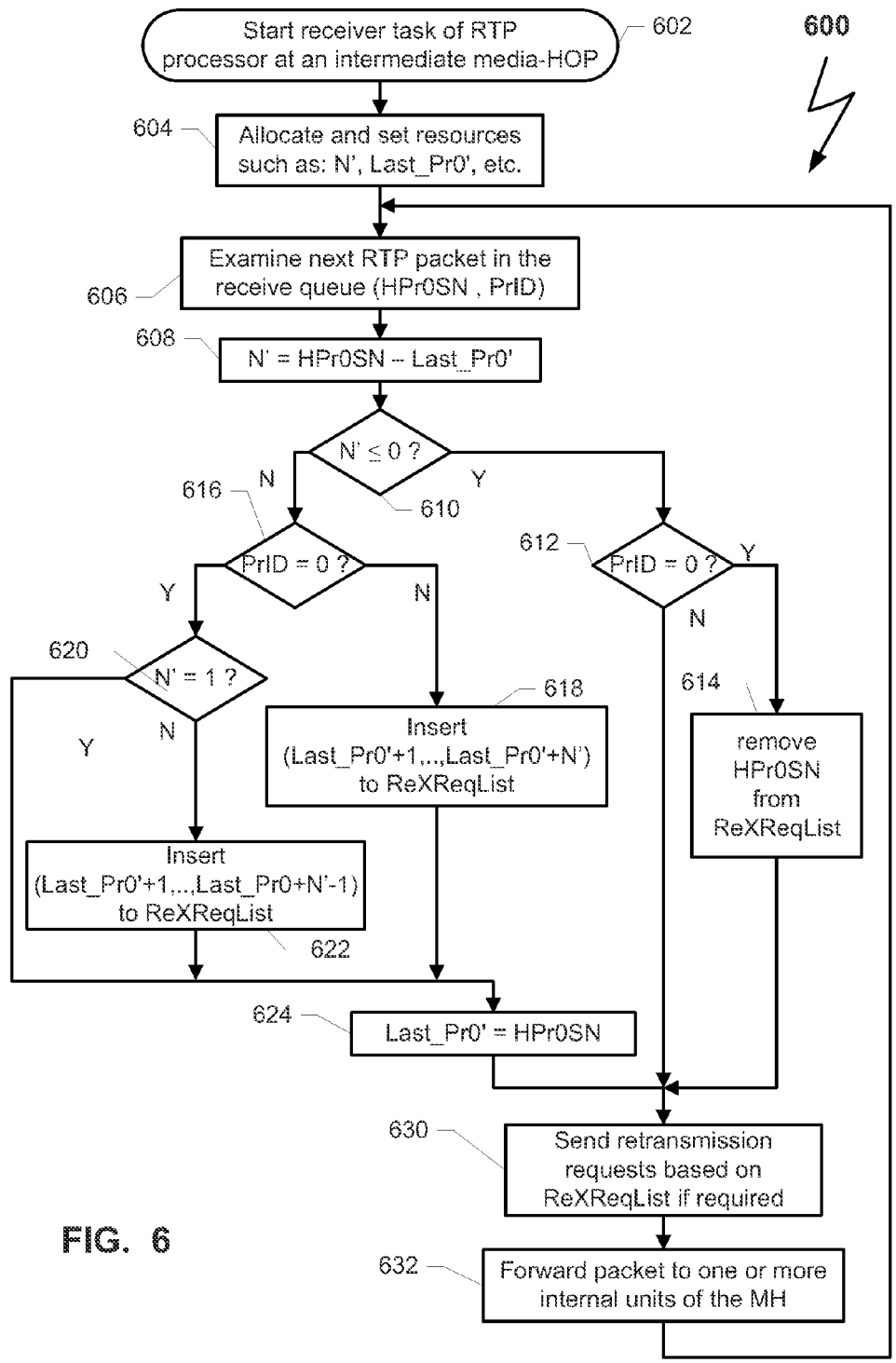
FIG. 6 illustrates a flowchart with relevant blocks of an example method that can be implemented by an example RTP processor of an intermediate media-hop while receiving a compressed SC stream.

FIG. 6 illustrates a flowchart with relevant blocks of an example Intermediate-Media-Hop-receiving method 600. Method 600 can be implemented by an embodiment of an IMHRRP 350 (FIG. 3B). IMHRRP 350 can be associated with an intermediate-media-hop that is located between a source of a compressed video stream and a receiving destination of that compressed SC video stream. The intermediate-media-hop can be an MRM located between two or more MREs, for example. Method 600 can be initiated 602 during establishment of the RTP connection between the media hop and EP/MRE that is the source of the video SC stream or a previous media hop. The RTP connection can be initiated during establishment of the conference session or upon joining of the transmitting EP/MRE to an ongoing session, for example.

After initiation, resources of IMHRRP 350 can be allocated 604 and set. Resources such as but not limited to buffer 360 (FIG. 3B), register N', register Last_Pr0' etc., can be allocated and reset. A next received RTP packet from buffer 360 (FIG. 3B) can be fetched. The extended RTP header of the packet can be parsed 606 and the values of the HPr0SN and PrID fields can be retrieved. The difference between the retrieved value of HPr0SN and the value written in the register Last_Pr0' can be calculated 608 and the result can be stored in the register 'N"'.

After storing the value of the difference in 'N"' a decision may be made 610 whether the value of 'N"' is less than or equal to zero. If the value is less than or equal to zero, indicating that the packet was received out of order over the path from the last media hop and the receiving EP, then another decision can be made 612 whether the value of the fetched PrID is zero, indicating that the current packet carries data of a critical frame. If 612 yes, then a retransmission request list (ReXReqList) can be examined 614 and a request for retransmission RTP packet having the same value of HPr0SN can be removed from the retransmission request list. Then method 600 can proceed to block 630. If 612 the value of the fetched PrID is not zero, indicating that it is not a critical packet, then method 600 can proceed to block 630.

At block 630 a retransmission request based on the ReXReqList can be sent over an RTCP connection from the Receiving-MH-RTP manager 380 (FIG. 3B) to the RTP manager at the other side of the RTCP connection. Then the received RTP packet can be forwarded 632 to one or more other internal units (not shown in the drawings) of the media hop and method 600 returns to block 606 for handling the next RTP packet in the buffer 360. In some embodiments, the ReXReqList can be cleared each time an Intra frame is received, or based on the age of each entry in the list, etc. Yet in some embodiments, at block 630 duplicated packets, packets having the same OSN, can be discarded from the OOSNB 260 (FIG. 2B).

Returning now to block 610, if the value of 'N' is greater than zero, then a decision can be made whether 616 the value of the fetched PrID is zero, indicating that the current packet carries data of a critical frame. If 616 not, indicating that one or more critical packets were lost along the last segment from the previous media hop or an EP/MRE, then the ReXReqList can be updated 618. The update can be done by writing a list of requested packets that the value of their HPr0SN field of the extended RTP header is equal to the value stored in Last_Pr0' register plus 1, plus 2, plus 3 . . . up to plus the value stored in register 'N'. After updating the ReXReqList, the value of the HPr0SN field of the extended RTP header of the current received RTP packet can be stored 624 instead of the previous value of register Last_Pr0' and method 600 can proceed to block 630.

If 616 the value of the fetched PrID is zero, indicating that the current packet carries data of a critical frame, then another decision can be made 620 whether the value of 'N' is equal to one. If 620 yes, indicating that no critical packet was lost, then process 600 can proceed to block 624. If 620 not, indicating that some critical packets were missed up to this one, thus the ReXReqList can be updated 622. The update can be done by writing a list of requested packets that the value of their HPr0SN field of the extended RTP header is equal to the value stored in Last_Pr0' register plus 1, plus 2, plus 3 . . . up to plus the value stored in register 'N' minus one. After updating the ReXReqList, the value of the HPr0SN field of the extended RTP header of the current received RTP packet is stored 624 instead of the previous value of register Last_Pr0 and method 600 can proceed to block 630.

Figure 7:
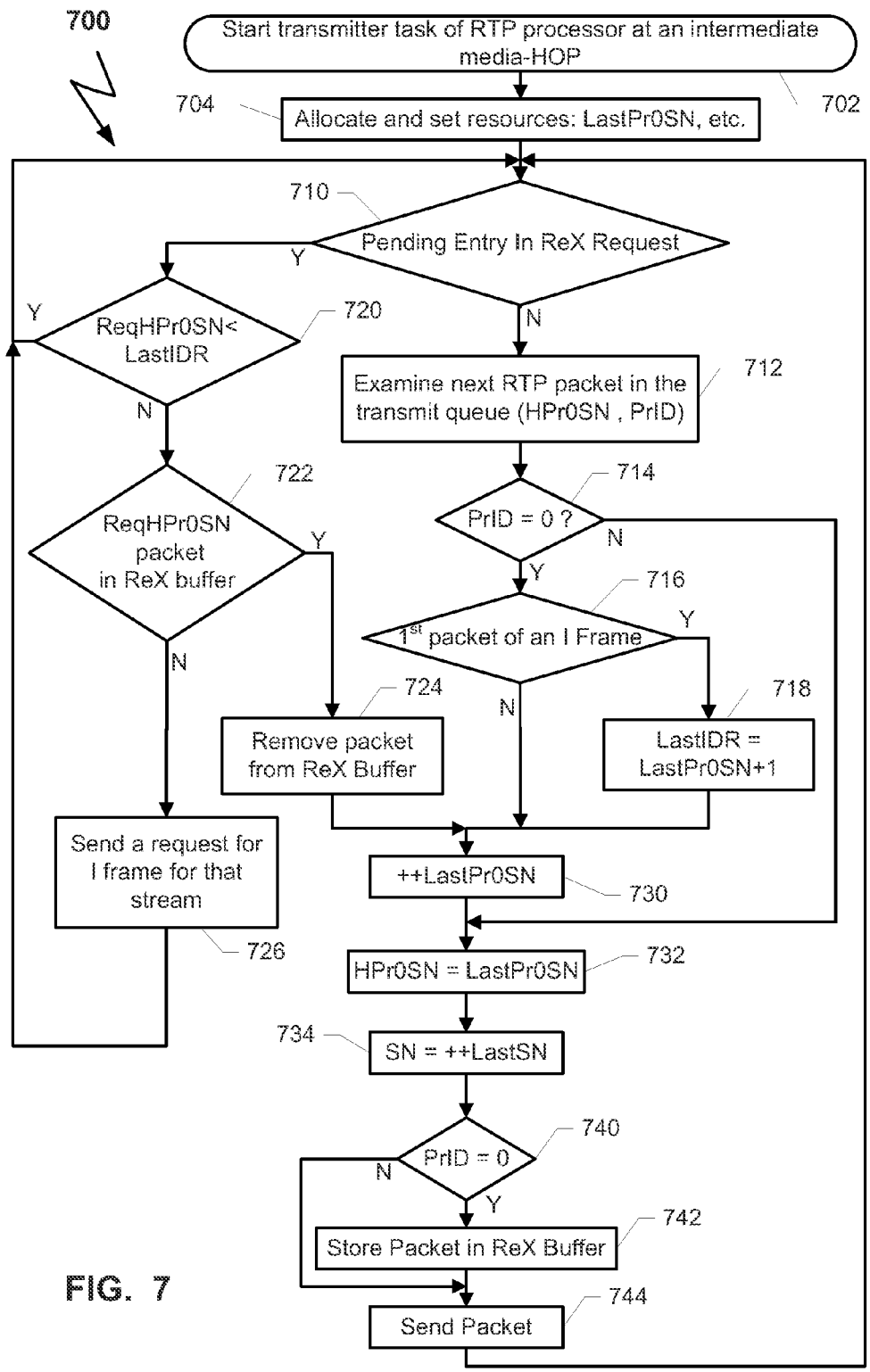
FIG. 7 illustrates a flowchart with relevant blocks of an example method that can be implemented by an example RTP processor of an intermediate media-hop while transmitting a compressed SC stream.

FIG. 7 illustrates a flowchart with relevant blocks of an example of Intermediate-Media-Hop-transmitting method 700. Method 700 can be implemented by an embodiment of an IMHTRP 300 (FIG. 3A). IMHTRP 300 can be associated with an intermediate-media-hop that is located between a source of a compressed video stream and a receiving destination of that compressed SC video stream. The intermediate-media-hop can be an MRM located between two or more MREs, for example. Method 700 can be initiated 702 during establishment of the RTP connection between the media hop and EP/MRE that is the destination of the video SC stream or a next media hop. The RTP connection can be initiated during establishment of the conference session or upon joining of a receiving EP/MRE to an ongoing session, for example.

After initiation, resources of IMHTRP 300 can be allocated 704 and set. For example, the two MH sequence counters 335a-d (FIG. 3A) can be allocated. Each counter (LastSN, and LastPr0SN) can be set to a random number or zero. In addition, buffers such as but not limited to MH-ReX-Pr0 buffer 330 (FIG. 3A), can be allocated 704 and reset, registers such as LastIDR can be allocated and reset, etc.

Next the MH-transmitting-RTP manager 340 (FIG. 3A) may check 710 whether a ReX request entry is in its queue. If not, method 700 can proceed to block 712. If 710 a ReX request entry is found, then the request is retrieved and the entry is cleared, the retrieved request can be parsed and a decision made 720 based upon whether the value of the requested HPr0SN, is less than the value stored in the LastIDR register. The LastIDR register stores the value of HPr0SN field of a first packet that carries the beginning of an Intra Pr0 frame. If 720 the value is smaller, indicating that an Intra frame was already issued and may be received after creating the compressed Pr0 video data carried by the missing packets, therefore there is no need for retransmission of the missing packets and method 700 can return to block 710.

If 720 the value is not smaller, then MH-ReX-Pr0 buffer 330 (FIG. 3A) can be checked 722 and a decision made based upon whether the Pr0 packet, which is mentioned in the entry of the list, exists in MH-ReX-Pr0 buffer 330. If the requested packet does not exist in MH-ReX-Pr0 buffer 330, then a decoder refresh request (an Intra request) can be sent 726 toward the source of the compressed SC video stream over an RTP connection and method 700 returns to block 710. If 722 the Pr0 packet, which is mentioned in the entry of the request list, exists in MH-ReX-Pr0 buffer 330, then the requested Pr0 packet can be fetched and removed 724 from ReX-Pr0 buffer 330 and method 700 can proceed to block 730 for handling the fetched requested packet.

Returning now to block 710, if there is no pending ReX request in the queue, then the input buffer 310 (FIG. 3A) can be examined 712 and a next RTP packet from the internal modules (not shown in the drawings) of IMHTRP 300 can be fetched. The RTP header and the extended header of the fetched packet can be parsed and the values of the HPr0SN field and the PrID field can be retrieved 712. Next, a decision can be made whether 714 the content of the payload comprises compressed video of a Pr0 frame, a critical frame. If 714 not, then method 700 can proceed to block 732.

If 714 the packet carries data of a critical frame, then the header of the RTP packet can be checked to determine whether 716 the RTP packet carries the beginning of a new critical Intra frame. If 716 the packet does not carry the beginning of a new critical Intra frame, then method 700 proceeds to block 730. If 716 the packet carries the beginning of a new critical Intra frame, then the sum of the value of LastPr0SN plus one can be written 718 in register LastIDR instead of the previous data of register LastIDR.

At block 730 sequence counter LastPr0SN can be incremented. The value of the sequence counter LastPr0SN can be written 732 in the HPr0SN field of the extended RTP header. In addition the LastSN sequence counter can be incremented 734 and the new value can be written in the SN field of the common RTP header.

Next, a decision can be made, based on the Pr0ID field of the extended RTP header, whether 740 the payload of the packet carries compressed video of a critical frame. If not, the RTP packet is transmitted 744 toward a next media-hop or a receiving EP/MRE via a network interface card (not shown in the drawings) and over the relevant RTP connection. If 740 the packet carries compressed video of a critical frame, then a copy of the RTP packet can be stored in the MH-ReX-Pr0 buffer 330 (FIG. 3A) and the packet can be transmitted 744 toward a next media-hop or a receiving EP/MRE via a network interface card (not shown in the drawings) and over the relevant RTP connection. After sending the RTP packet toward its destination, method 700 can return to block 710 starting a new cycle.

In the description and claims of the present disclosure, "comprise," "include," "have," and conjugates thereof are used to indicate that the object or objects of the verb are not necessarily a complete listing of members, components, elements, or parts of the subject or subjects of the verb.

As explained above disclosed embodiments can include a method comprising: obtaining a stream of a plurality of transport protocol (TP) packets at a media transmitting device, the stream of the plurality of TP packets carrying compressed media data-units that were created by a scalable coding (SC) encoder, each of the plurality of TP packets having an assigned priority level, wherein the stream of the plurality of TP packets comprises at least one packet of a first priority level and at least one packet of a second priority level; assigning a first sequence number to a first header field of a plurality of header fields for each of the plurality of TP packets, wherein the first sequence number is changed for each TP packet of the first priority level; and transmitting the plurality of TP packets toward one or more media receiving devices.

Also, the SC encoder can be included in an originating media transmitting device. In addition a second sequence number could be assigned to a second header field at the originating media transmitting device with the second sequence number indicating an original sequence number of packets of the first priority level. The second sequence number could be used at a final media receiving device to identify one or more missing first priority level packets from any previous network segment. The originating media transmitting device could also assign a third sequence number to a third header field, the third sequence number indicating an original sequence number of all TP packets, wherein the third sequence number field could also be used to reorder TP packets without regard to priority.

The originating media transmitting device could comprises an endpoint or a media-relay endpoint (MRE) having the SC encoder that compresses media generated by the MRE or even a multipoint-control unit (MCU) and the SC encoder encodes a continuous presence (CP) video image from video images received from a plurality of endpoints. The first sequence number could be used by a first media receiving device, selected from the one or more media receiving devices, to identify one or more missing TP packets and request retransmission via a network segment associated with the first media receiving device.

In addition the disclosed methods and systems could be configured for storing one or more transmitted TP packets in a source-retransmission buffer; receiving a request for retransmission of a specific TP packet from a receiving device; searching the source-retransmission buffer for the specific TP packet; and retransmitting the specific TP packet toward the receiving device in response to the request. Optionally, only TP packets having the first priority level are stored in the source-retransmission buffer and the request for retransmission could be received from an endpoint that receives TP packets to display a continuous presence (CP) video image. In some cases requesting an Intra frame from the originating media transmitting device if the specific TP packet was not found in the source-retransmission buffer could be beneficial. Of course, some of the above disclosed methods could be implemented on a media transmitting device that comprises an intermediate media hop.

It is to be understood that the above description is intended to be illustrative, and not restrictive. The above-described apparatus, systems, and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person of ordinary skill in the art. Furthermore, some embodiments of the present disclosure may be implemented by combination of features and elements that have been described in association to different example embodiments along the discloser. The scope of the invention is limited only by the following claims and equivalents thereof.

What is claimed is:

1. A method comprising:
   obtaining a stream of a plurality of transport protocol (TP) packets at a media transmitting device, the stream of the plurality of TP packets carrying compressed media data-units that were created by a scalable coding (SC) encoder, each of the plurality of TP packets having an assigned priority level, wherein the stream of the plurality of TP packets comprises at least one packet of a first priority level and at least one packet of a second priority level;
   assigning a first sequence number to a first header field of a plurality of header fields for each of the plurality of TP packets, wherein the first sequence number is changed for each TP packet of the first priority level; and
   transmitting the plurality of TP packets toward one or more media receiving devices;
   wherein the media transmitting device is an intermediate node between an originating media transmitting device and a final media receiving device;
   wherein the first sequence number is replaced for each TP packet of the first priority level by each intermediate node along the path of the stream;
   wherein the first sequence number is usable by a first media receiving device, selected from the one or more media receiving devices, to identify one or more missing TP packets that got lost in a network segment between the media transmitting device and the first media receiving device and to request retransmission of missing TP packets from the media transmitting device; and
   wherein each first priority TP packet reflects compressed video data of frames of a base layer; and
   wherein the media transmitting device or the one or more media receiving devices comprise a multipoint control unit (MCU), a media relay multipoint control unit (MRM), a media gateway, or a media-hop.

2. The method of claim 1, wherein the SC encoder is included in the originating media transmitting device.

3. The method of claim 2, further comprising assigning, at the originating media transmitting device, a second sequence number to a second header field, the second sequence number indicating an original sequence number of packets of the first priority level.

4. The method of claim 3, wherein the second sequence number is used at the final media receiving device to identify one or more missing first priority level packets from any previous network segment.

5. The method of claim 2, further comprising assigning, at the originating media transmitting device, a third sequence number to a third header field, the third sequence number indicating an original sequence number of TP packets independent of their priority level.

6. The method of claim 5, wherein the third sequence number field is used at the final receiving device to reorder TP packets without regard to priority.

7. The method of claim 2, wherein the originating media transmitting device is a media-relay endpoint (MRE) having the SC encoder that compresses media generated by the MRE.

8. The method of claim 2, wherein the originating media transmitting device comprises a multipoint-control unit (MCU) and the SC encoder encodes a continuous presence (CP) video image from video images received from a plurality of endpoints.

9. The method of claim 1, wherein the first priority level comprises a high priority level.

10. The method of claim 1, wherein the first sequence number is used by a first media receiving device, selected from the one or more media receiving devices, to identify one or more missing first priority level TP packets and request retransmission via a network segment associated with the first media receiving device.

11. The method of claim 1, further comprising:
  storing one or more transmitted TP packets in a source-retransmission buffer;
  receiving a request for retransmission of a specific TP packet from a receiving device;
  searching the source-retransmission buffer for the specific TP packet; and
  retransmitting the specific TP packet toward the receiving device in response to the request.

12. The method of claim 11, wherein only TP packets having the first priority level are stored in the source-retransmission buffer.

13. The method of claim 11, wherein the request for retransmission is received from an endpoint that receives TP packets to display a continuous presence (CP) video image.

14. The method of claim 11, further comprising requesting an Intra frame from the originating media transmitting device if the specific TP packet was not found in the source-retransmission buffer.

15. The method of claim 1, wherein the SC encoder performs a Scalable Coding encoding comprising temporal scalability, each first priority level TP packet reflects compressed video data of frames of a base layer.

16. The method of claim 1, wherein the transport protocol (TP) comprises Real-time Transport Protocol (RTP).

17. The method of claim 1, wherein the first sequence number is incremented for each transmitted first priority level TP packet that is transmitted or retransmitted.

18. The method of claim 1, wherein the media transmitting device comprises an intermediate media hop.

19. A media transmitting device comprising:
  a network interface;
  a memory; and
  a processor communicatively coupled to the network interface and the memory, wherein the processor is configured to:
  obtain a stream of a plurality of transport protocol (TP) packets carrying compressed media data-units that were created by a scalable coding (SC) encoder, each of the plurality of TP packets having an assigned priority level, wherein the stream of the plurality of TP packets comprises at least one packet of a first priority level and at least one packet of a second priority level;
  assign a first sequence number to a first header field of a plurality of header fields for each of the plurality of TP packets; and
  transmit, via the network interface, the plurality of TP packets toward one or more media receiving devices;
  wherein the media transmitting device is an intermediate node between an originating media transmitting device and a final media receiving device;
  wherein the first sequence number is replaced for each TP packet of the first priority level by each intermediate node along the path of the stream;
  wherein the first sequence number is usable by a first media receiving device, selected from the one or more media receiving devices, to identify one or more missing TP packets that got lost in a network segment between the media transmitting device and the first media receiving device and to request retransmission of missing TP packets from the media transmitting device; and
  wherein each first priority TP packet reflects compressed video data of frames of a base layer; and
  wherein the SC encoder performs a Scalable Coding encoding comprising at least temporal scalability, each first priority level TP packet reflecting compressed video data of frames of a base layer.

20. The media transmitting device of claim 19, further comprising an SC encoder.

21. The media transmitting device of claim 19, wherein the first priority level comprises a high priority level.

22. The media transmitting device of claim 19, wherein the media transmitting device or the one or more media receiving devices comprise multipoint conferencing devices.

23. The media transmitting device of claim 19, wherein the processor is further configured to assign a second sequence number to a second header field, the second sequence number indicating an original sequence number of packets of the first priority level.

24. The media transmitting device of claim 23, wherein the processor is further configured to assign a third sequence number to a third header field, the third sequence number indicating an original sequence number of all TP packets.

25. The media transmitting device of claim 19, wherein the first sequence number field is incremented for each transmitted first priority level TP packet that is transmitted or retransmitted.

26. A non-transitory computer readable medium comprising instruction stored thereon to configure a processor of a media transmitting device to:
  obtain a stream of a plurality of transport protocol (TP) packets carrying compressed media data-units that were created by a scalable coding (SC) encoder, each of the plurality of TP packets having an assigned priority level, wherein the stream of the plurality of TP packets comprises at least one packet of a first priority level and at least one packet of a second priority level;
  assign a first sequence number to a first header field of a plurality of header fields for each of the plurality of TP packets, wherein the first sequence number is changed for each TP packet of the first priority level; and
  transmit the plurality of TP packets toward one or more media receiving devices;
  wherein the media transmitting device is an intermediate node between an originating media transmitting device and a final media receiving device;
  wherein the first sequence number is replaced for each TP packet of the first priority level by each intermediate node along the path of the stream;
  wherein the first sequence number is usable by a first media receiving device, selected from the one or more media receiving devices, to identify one or more missing TP packets that got lost in a network segment between the media transmitting device and the first media receiving device and to request retransmission of missing TP packets from the media transmitting device; and
  wherein each first priority TP packet reflects compressed video data of frames of a base layer; wherein the instructions further comprise instructions to configure the processor to:

store one or more transmitted TP packets in a source-retransmission buffer;
receive a request for retransmission of a specific TP packet from a receiving device;
search the source-retransmission buffer for the specific TP packet; and
retransmit the specific TP packet toward the receiving device in response to the request.

27. The computer readable medium of claim 26, wherein the instructions to configure the processor to store in the source-retransmission buffer further comprise instructions to configure the processor to store only TP packets having the first priority level.

28. A method comprising:
obtaining a stream of a plurality of transport protocol (TP) packets at a media transmitting device, the stream of the plurality of TP packets carrying compressed media data-units that were created by a scalable coding (SC) encoder, each of the plurality of TP packets having an assigned priority level, wherein the stream of the plurality of TP packets comprises at least one packet of a first priority level and at least one packet of a second priority level;
assigning a first sequence number to a first header field of a plurality of header fields for each of the plurality of TP packets, wherein the first sequence number is changed for each TP packet of the first priority level; and
transmitting the plurality of TP packets toward one or more media receiving devices;
wherein the media transmitting device is an intermediate node between an originating media transmitting device and a final media receiving device;
wherein the first sequence number is replaced for each TP packet of the first priority level by each intermediate node along the path of the stream;
wherein the first sequence number is usable by a first media receiving device, selected from the one or more media receiving devices, to identify one or more missing TP packets that got lost in a network segment between the media transmitting device and the first media receiving device and to request retransmission of missing TP packets from the media transmitting device; and
wherein each first priority TP packet reflects compressed video data of frames of a base layer; and
wherein the SC encoder performs a Scalable Coding encoding comprising temporal scalability, each first priority level TP packet reflects compressed video data of frames of a base layer.

29. The method of claim 28, wherein the first priority level comprises a high priority level.

30. The method of claim 28, wherein the first sequence number is used by a first media receiving device, selected from the one or more media receiving devices, to identify one or more missing first priority level TP packets and request retransmission via a network segment associated with the first media receiving device.

31. The method of claim 28, further comprising:
storing one or more transmitted TP packets in a source-retransmission buffer;
receiving a request for retransmission of a specific TP packet from a receiving device;
searching the source-retransmission buffer for the specific TP packet; and
retransmitting the specific TP packet toward the receiving device in response to the request.

32. The method of claim 31, wherein only TP packets having the first priority level are stored in the source-retransmission buffer.

\* \* \* \* \*